United States Patent
Cho

(10) Patent No.: US 11,132,019 B1
(45) Date of Patent: Sep. 28, 2021

(54) DISPLAY APPARATUS

(71) Applicant: LG Display Co., Ltd., Seoul (KR)

(72) Inventor: Seokhyo Cho, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/139,306

(22) Filed: Dec. 31, 2020

(30) Foreign Application Priority Data

Aug. 7, 2020 (KR) .......................... 10-2020-0099478

(51) Int. Cl.
*F16M 11/00* (2006.01)
*G06F 1/16* (2006.01)
*F16M 11/10* (2006.01)
*F16M 13/02* (2006.01)

(52) U.S. Cl.
CPC ......... *G06F 1/1607* (2013.01); *F16M 11/105* (2013.01); *F16M 13/02* (2013.01); *G06F 2200/1612* (2013.01); *G06F 2200/1613* (2013.01); *G06F 2200/1614* (2013.01)

(58) Field of Classification Search
None
See application file for complete search history.

(56) References Cited

U.S. PATENT DOCUMENTS

| | | | | |
|---|---|---|---|---|
| 5,715,138 A * | 2/1998 | Choi | ...................... | F16M 11/10 361/679.21 |
| 7,336,478 B2 | 2/2008 | Jang | | |
| 7,441,738 B2 * | 10/2008 | Kim | ..................... | B60R 11/0235 248/292.12 |
| 8,649,161 B2 * | 2/2014 | Kato | ................ | H04N 21/41422 361/679.01 |
| 2007/0205341 A1 * | 9/2007 | Chih | ..................... | F16M 11/046 248/125.9 |
| 2014/0340851 A1 * | 11/2014 | Yomogita | ............ | H05K 5/0217 361/725 |

(Continued)

FOREIGN PATENT DOCUMENTS

KR 10-2003-0015642 A 2/2003
KR 10-2005-0020255 A 3/2005
(Continued)

OTHER PUBLICATIONS

Notice of Preliminary Examination Result dated Sep. 7, 2020 from corresponding Korean Patent Application No. 10-2020-0099478 and English translation with statement in 5 pages.

(Continued)

*Primary Examiner* — Steven M Marsh
(74) *Attorney, Agent, or Firm* — Polsinelli PC

(57) ABSTRACT

A display apparatus includes a display module displaying an image; a support assembly facing the display module; a driver assembly installed on the support assembly to supply power to rotate the display module; a linearly-movable assembly connected to the driver assembly to receive power therefrom and moving in a linear manner in a first direction along the support assembly; a connector assembly having one end fixed to the display module and the other end rotatably disposed on the linearly-movable assembly; and a guide mechanism connected to the support assembly and the connector assembly to allow the connector assembly to rotate under linear movement of the linearly-movable assembly.

20 Claims, 23 Drawing Sheets

(56) References Cited

U.S. PATENT DOCUMENTS

| | | | | |
|---|---|---|---|---|
| 2015/0146359 A1* | 5/2015 | Katsunuma | ............ | F16M 11/00 |
| | | | | 361/679.22 |
| 2015/0185761 A1* | 7/2015 | Song | .................... | G06F 1/1601 |
| | | | | 361/679.21 |
| 2017/0023177 A1* | 1/2017 | Yomogita | .............. | G02B 7/005 |

FOREIGN PATENT DOCUMENTS

| | | |
|---|---|---|
| KR | 10-2008-0101110 A | 11/2008 |
| KR | 10-2011-0038559 A | 4/2011 |
| KR | 10-1399209 B1 | 6/2014 |

OTHER PUBLICATIONS

Notice of Allowance dated Oct. 15, 2020 from corresponding Korean Patent Application No. 10-2020-0099478 and English translation with statement in 3 pages.

\* cited by examiner

DISPLAY APPARATUS

CROSS-REFERENCE TO RELATED APPLICATION

The present disclosure claims priority to and the benefit of Korean Patent Application No. 10-2020-0099478, filed on Aug. 7, 2020, which is hereby incorporated by reference in its entirety.

BACKGROUND

Field of the Disclosure

The present disclosure relates to a display apparatus, and more particularly, to a display apparatus capable of providing various viewing modes.

Description of the Background

In general, a flat panel display apparatus includes a liquid crystal display apparatus, a plasma display apparatus, a field emission display apparatus, an organic light emitting display apparatus, etc. which are actively studied. The liquid crystal display apparatus and the organic light emitting display apparatus are mainly used in terms of mass production technology, easiness of driving means, and high-definition implementation.

The conventional display apparatus may not provide various viewing modes because a screen that outputs an image is fixed to a landscape mode.

SUMMARY

Accordingly, the present disclosure is to provide a display apparatus capable of providing various viewing modes.

Further, present disclosure is to provide a display apparatus capable of easily rotating a screen that outputs an image.

The present disclosure is not limited to the above-mentioned purpose. Other features and advantages in accordance with the present disclosure as not mentioned above may be understood from following descriptions and more clearly understood from aspects in accordance with the present disclosure. Further, it will be readily appreciated that the purposes and advantages in accordance with the present disclosure may be realized by features and combinations thereof as disclosed in the claims.

The present disclosure provides a display apparatus in which a linearly-movable assembly is moved via an operation of a driver assembly, a connector assembly rotatably installed on the linearly-movable assembly is rotated under guiding by a guide mechanism, such that a display module switches between a landscape viewing mode and a portrait viewing mode, and a vertical level of the display module is adjusted.

Specifically, the connector assembly that moves up and down together with the linearly-movable assembly is rotated under an operation of the guide mechanism that induces rotation from the linear movement via meshing between gears, such that the rotation of the display module may be made automatically.

Further, the vertical level of the display module may be adjusted under the vertical movement of the connector assembly that moves up and down together with the linearly-movable assembly.

The display apparatus according to the present disclosure may include: a display module displaying an image; a support assembly facing the display module; a driver assembly installed on the support assembly to supply power to rotate the display module; a linearly-movable assembly connected to the driver assembly to receive power therefrom and moving in a linear manner in a first direction along the support assembly; a connector assembly having one end fixed to the display module and the other end rotatably disposed on the linearly-movable assembly; and a guide mechanism connected to the support assembly and the connector assembly to allow the connector assembly to rotate under linear movement of the linearly-movable assembly.

Further, the display module may include a display panel that displays an image, and a plate-shaped support panel located on a rear side of the display panel to support the display panel.

Further, the support assembly may include a first support located on a rear side of the display module, and the second support installed to face the first support, and a hinge-type connector to pivotally connect the first support and the second support to each other.

Further, the first support may include a first support body facing the display module; a first bridge extending from or retracting toward the first support body; and a first bridge guide connected to the first support body and the first bridge, wherein the first bridge guide guides a linear movement of the first bridge.

Further, the first bridge may include a first bridge body extending in a width direction of the first support body, and bending upwards at both ends thereof, and a first side member extending upwards from the first bridge body and connected to the first bridge guide.

Further, the first bridge guide may include a first rail fixed to the first support body, and extending along the movement path of the first bridge, and a first holder supported on an outer face of the first rail, and installed to be able to slide along the first rail, and connected to the first bridge.

Further, the first support may further include a first movement switch installed on the first support body to restrain the movement of the first bridge, wherein the movement restriction of the first movement switch is disabled by an external force to allow the movement of the first bridge.

Further, the first movement switch may include a first switch body having a first switch protrusion engaged with a first side gear disposed on a side face of the first bridge, and a first actuating protrusion that protrudes outwardly of the first switch body and moves inwardly of the first switch body to move the first switch protrusion.

Further, the first support may further include a first switch controller installed to face the first actuating protrusion, wherein the first switch controller is actuated by an external force to pressurize the first actuating protrusion.

Further, the first switch controller may include a first movable bar installed to face the first actuating protrusion, and moving in a linear direction by an external force, a first upper holder supporting a top of the first movable bar, a first lower holder supporting a bottom of the first movable bar, a first upper elastic member having a top contacting the first upper holder and a bottom supported on the first movable bar, wherein the first upper elastic member presses the first movable bar downward using the elastic force, and a first lower elastic member having a top supported on the first movable bar, and a bottom in contact with the first lower holder, wherein the first lower elastic member presses the first movable bar upward using an elastic force.

Further, the second support may include a second support body facing the first support; a second bridge extending from or retracting toward the second support body; and a second bridge guide connected to the second support body and the second bridge, wherein the second bridge guide guides a linear movement of the second bridge.

Further, the second bridge may include a second bridge body extending in a width direction of the second support body, and bending upwards at both ends thereof, and a second side member extending upwards from the second bridge body and connected to the second bridge guide.

Further, the second bridge guide may include a second rail fixed to the second support body, and extending along the movement path of the second bridge, and a second holder supported on an outer face of the second rail, and installed to be able to slide along the second rail, and connected to the second bridge.

Further, the second support may further include a second movement switch installed on the second support body to restrain the movement of the second bridge, wherein the movement restriction of the second movement switch is disabled by an external force to allow the movement of the second bridge.

Further, the second movement switch may include a second switch body having a second switch protrusion engaged with a second side gear disposed on a side face of the second bridge, and a second actuating protrusion that protrudes outwardly of the second switch body and moves inwardly of the second switch body to move the second switch protrusion.

Further, the second support may further include a second switch controller installed to face the second actuating protrusion, wherein the second switch controller is actuated by an external force to pressurize the second actuating protrusion.

Further, the second switch controller may include a second movable bar installed to face the second actuating protrusion, and moving in a linear direction by an external force, a second upper holder supporting a top of the second movable bar, a second lower holder supporting a bottom of the second movable bar, a second upper elastic member having a top contacting the second upper holder and a bottom supported on the second movable bar, wherein the second upper elastic member presses the second movable bar downward using the elastic force, and a second lower elastic member having a top supported on the second movable bar, and a bottom in contact with the second lower holder, wherein the second lower elastic member presses the second movable bar upward using an elastic force.

Further, a hanger receiving groove into which a wall hanger is inserted may be defined in a side face of the second support body.

Further, the linearly-movable assembly may include: a screw bar rotating upon receiving the power from the driver assembly, and threads are formed on an outer face of the screw bar; a ball nut engaging with the threads and installed on an outer face of the screw bar, wherein the ball nut moves in a linear manner under the rotation of the screw bar; a first movable body coupled to the ball nut and moving in a linear manner together with the ball nut; and a second movable body coupled to the first movable body and moving in a linear manner together with the first movable body.

Further, the linearly-movable assembly may further include: a linear rail fixed to the support assembly and extending in a linear manner along a movement path of the second movable body; and a movable block supported on an outer face of the linear rail, and fixed to the second movable body and moving together with the second movable body.

Further, the linearly-movable assembly may further include a power transmitter to transmit the power from the driver assembly to the screw bar.

Further, the power transmitter may include: a driving gear connected to a driving shaft of the driver assembly; a driven gear connected to the screw bar; and a belt connecting the driving gear and the driven gear to each other to transmit the power therebetween.

Further, the second movable body may include a slidable body supporting the connector assembly to be rotatable and having an opening defined therein, and a side member extending from the slidable body, wherein the movable block and the first movable body are connected to the side member.

Further, the connector assembly may include: a swing bracket fixed to the display module facing the support assembly, and rotatably connected to the linearly-movable assembly; and a rotatable connector fixed to the swing bracket protruding outwardly of the linearly-movable assembly, and rotating together with the swing bracket.

Further, the connector assembly may further include an annular bearing installed on an outer face of the swing bracket, and located between the swing bracket and the linearly-movable assembly to reduce frictional force generated when the swing bracket rotates.

Further, the guide mechanism may include: a circular gear formed along and on an outer circumference of the connector assembly; and a linear gear having one portion fixed to the support assembly and the other portion extending in a longitudinal direction of the support assembly, wherein linearly arranged threads are formed on a side face of the linear gear and mesh with the circular gear.

Further, the circular gear moves in a linear direction together with the connector assembly, and meshes with the linear gear and then rotates to allow the display module to rotate to switch between the first mode and the second mode.

Further, the circular gear may be formed only on a predefined section of an outer circumference of the connector assembly, wherein the predefined section corresponds to a rotation angle range of the display module in which the display module switches between the first mode and the second mode.

Further, the guide mechanism may further include a stopper fixed to the connector assembly, wherein the stopper is located at a movement path of the circular gear, and allows the circular gear to rotate within a predefined rotation angle range.

Further, the stopper may include: a first stopper protruding outwardly of the connector assembly, and engaging with one end of the circular gear to restrain rotation of the circular gear; and a second stopper spaced apart from the first stopper, and protruding outwardly of the connector assembly, and engaging with the other end of the circular gear to restrain the rotation of the circular gear.

Further, the apparatus may further include a movable controller moving in a linear manner together with the connector assembly, and connected to the display module to control vertical movement and rotation of the display module.

Further, the apparatus may further include a fixed controller fixed to the support assembly, and connected to at least one of the display module or the movable controller to control an operation of the display module.

In the display apparatus according to the present disclosure, the display module is rotated under the operation of the driver assembly, and may switch between the landscape viewing mode and the portrait viewing mode to satisfy various consumer preferences.

Further, the display apparatus according to the present disclosure may satisfy various preferences of consumers because the vertical level of the display module is automatically adjusted under the operation of the driver assembly.

Further, in the display apparatus according to the present disclosure, the connector assembly which is moved in the vertical direction via the driver assembly may be rotated via the guide mechanism. Thus, the rotation of the display module that outputs the image is easily made, thus reducing the time and cost required for rotating the display module.

Further, in the display apparatus according to the present disclosure, the support assembly supporting the display module may switch between the standing mode and the wall mounted mode. Thus, an installation cost thereof may be reduced.

Further, in the display apparatus according to the present disclosure, the movable controller that moves together with the display module and the fixed controller that is fixed to the support assembly are separately installed from each other. Thus, the display module may be light, and a simple maintenance structure thereof may be realized to reduce a maintenance cost thereof.

In addition to the effects as described above, specific effects in accordance with the present disclosure will be described together with following detailed descriptions for carrying out the disclosure.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
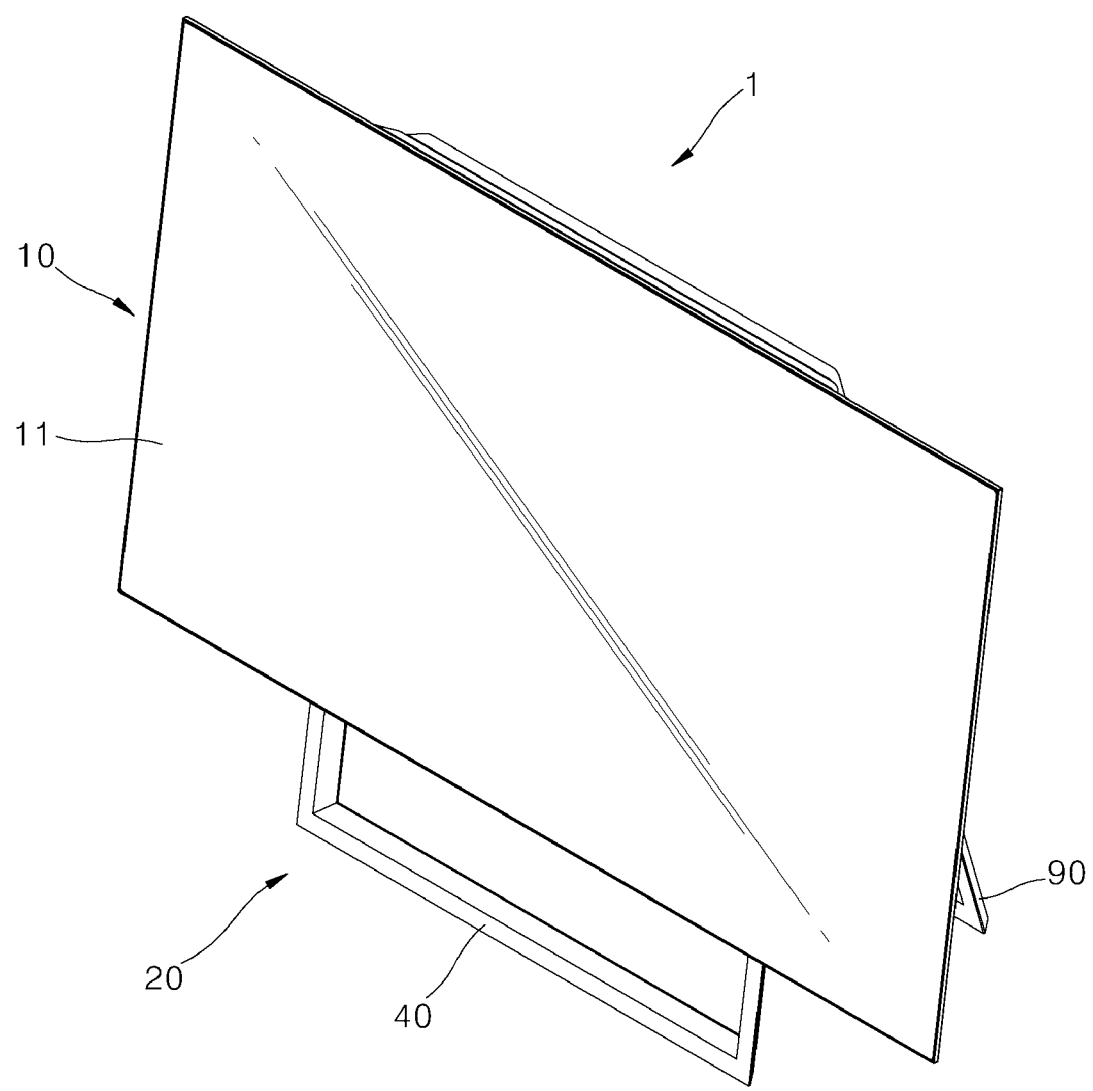
FIG. 1 is a perspective view showing a front face of a display apparatus according to a first aspect of the present disclosure.

For simplicity and clarity of illustration, elements in the figures are not necessarily drawn to scale. The same reference numbers in different figures represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various aspects are illustrated and described further below. It will be understood that the description herein is not intended to limit the claims to the specific aspects described. On the contrary, it is intended to cover alternatives, modifications, and equivalents as may be included within the spirit and scope of the present disclosure as defined by the appended claims.

The terminology used herein is for the purpose of describing particular aspects only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly disposed on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

[Display Apparatus]

Figure 5:
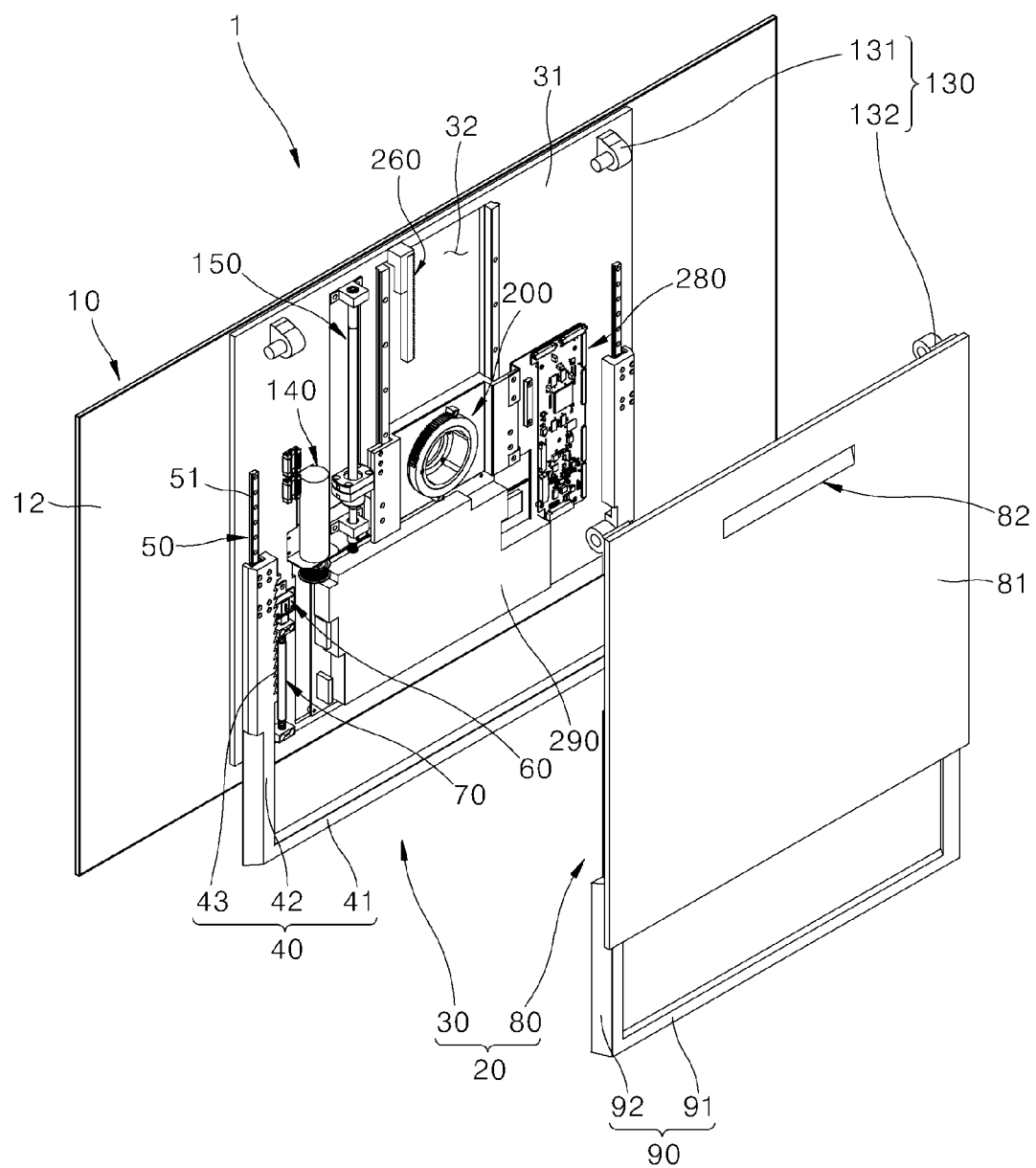
FIG. 5 is an exploded perspective view of the display apparatus according to the first aspect of the present disclosure.

FIG. 1 is a perspective view showing a front face of a display apparatus 1 according to a first aspect of the present disclosure. FIG. 5 is an exploded perspective view of the display apparatus 1 according to the first aspect of the present disclosure.

As shown in FIG. 1 and FIG. 5, the display apparatus 1 according to the first aspect of the present disclosure may include at least one of a display module 10, a support assembly 20, a driver assembly 140, a linearly-movable assembly 150, a connector assembly 200, a guide mechanism 260, a movable controller 280, and a fixed controller 290.

In the display apparatus 1, under the operation of the driver assembly 140, the linearly-movable assembly 150 is moved in a vertical direction as a longitudinal direction of a first support 30. The connector assembly 200 rotatably installed on the linearly-movable assembly 150 is rotated by the guide mechanism 260. Therefore, a landscape viewing mode and a portrait viewing mode may be selectively provided, and a vertical level of the display module 10 may also be adjusted automatically. In the landscape viewing mode, a horizontal length of the display module 10 is larger than a vertical length thereof. In the portrait viewing mode, the horizontal length of the display module 10 is smaller than the vertical length thereof.

The rotation of the display module 10 is specifically described. The connector assembly 200 which is moved up and down along the linearly-movable assembly 150 is rotated via the operation of the guide mechanism 260 which induces rotation via meshing of gears. Thus, the rotation of the display module 10 may be done automatically.

Further, the vertical level of the display module 10 may be automatically adjusted using the connector assembly 200 that is moved up and down along the linearly-movable assembly 150.

[Display Module]

Figure 2:
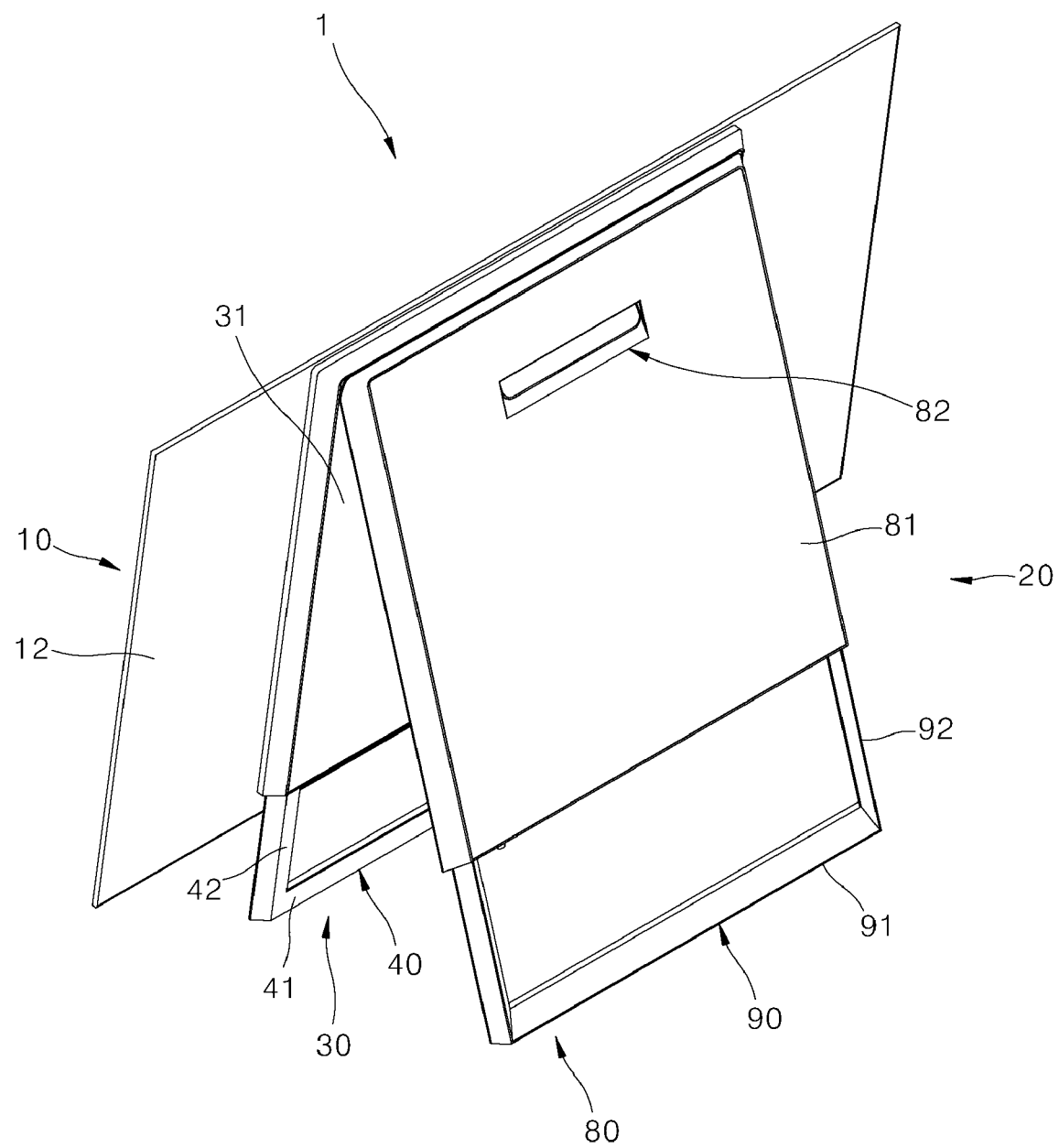
FIG. 2 is a perspective view showing a rear face of the display apparatus according to the first aspect of the present disclosure.

FIG. 2 is a perspective view showing a rear face of the display apparatus 1 according to the first aspect of the present disclosure.

As shown in FIG. 1 and FIG. 2, the display module 10 according to the first aspect of the present disclosure includes a display panel 11 and a support panel 12.

The display panel 11 may be modified in various ways as long as it displays the image. The display panel 11 according to the first aspect of the present disclosure outputs an image in a front direction. When necessary, audio may be output together with the image. The display panel 11 may be formed in a rectangular and thin plate shape.

The support panel 12 is located on a rear side of the display panel 11, and is embodied as a plate shape that supports the display panel 11. The support panel 12 is connected to the connector assembly 200, and moves in the vertical direction and rotates together with a swing bracket 210 disposed on the connector assembly 200.

The display apparatus 1 according to the first aspect of the present disclosure may be viewed to a user in a first mode and a second mode. The first mode is a landscape viewing mode in which the horizontal length of the display module 10 is larger than the vertical length of the display module 10. Further, the second mode is a portrait viewing mode in which the horizontal length of the display module 10 is smaller than the vertical length of the display module 10.

When the display module 10 according to the first aspect of the present disclosure is rotated from the first mode to the second mode, the display module performs linear movement to a predetermined vertical level and then is rotated. That is, before the display module 10 rotates from the first mode as the landscape viewing mode to the second mode as the portrait viewing mode, the display module moves linearly to the predetermined vertical level. Thus, an enough space to allow rotating from the first mode to the second mode may be secured.

To describe this conversion between the first and second modes in more detail, the display module 10 is moved up in a linear direction via the upward movement of the linearly-movable assembly 150. Then, the display module 10 is rotated under guidance of the guide mechanism 260 which induces rotation via engagement of gears. Therefore, the display module 10 may be rotated to the first mode or the second mode under guidance of the guide mechanism 260.

That is, the display module 10 may be changed to the first mode or the second mode by means of the guide mechanism 260 having a movable circular gear 265 and a fixed linear gear 261. When the display module 10 is changed to the first mode or the second mode, the display module 10 performs the linear movement to a predetermined vertical level and then is rotated. Therefore, it is possible to easily change a viewing mode of the display module 10 to the first mode or the second mode and adjust the vertical level of the display module 10.

[Support Assembly]

Figure 3:
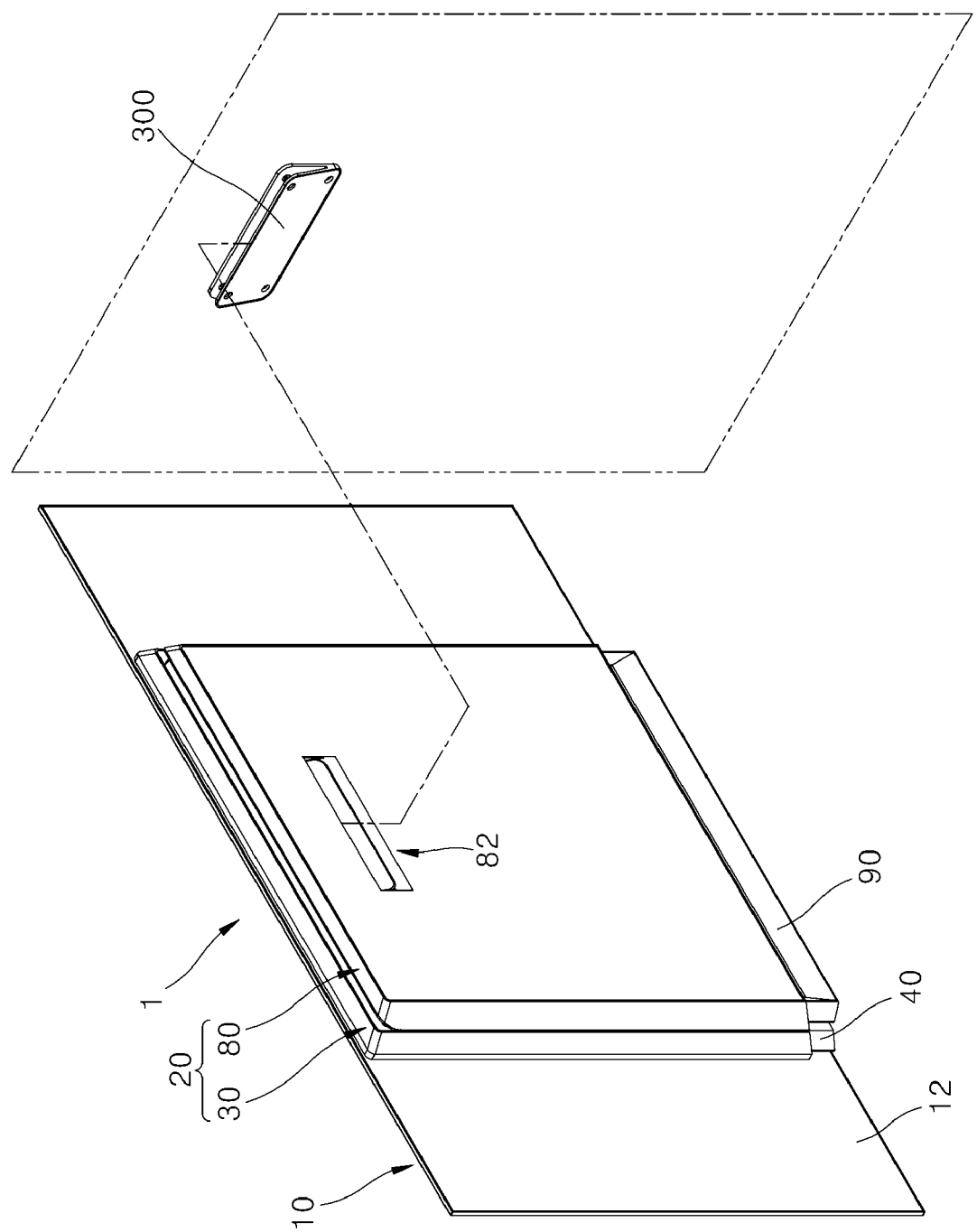
FIG. 3 is a perspective view showing a state in which the display apparatus according to the first aspect of the present disclosure is separated from a wall hanger.
Figure 4:
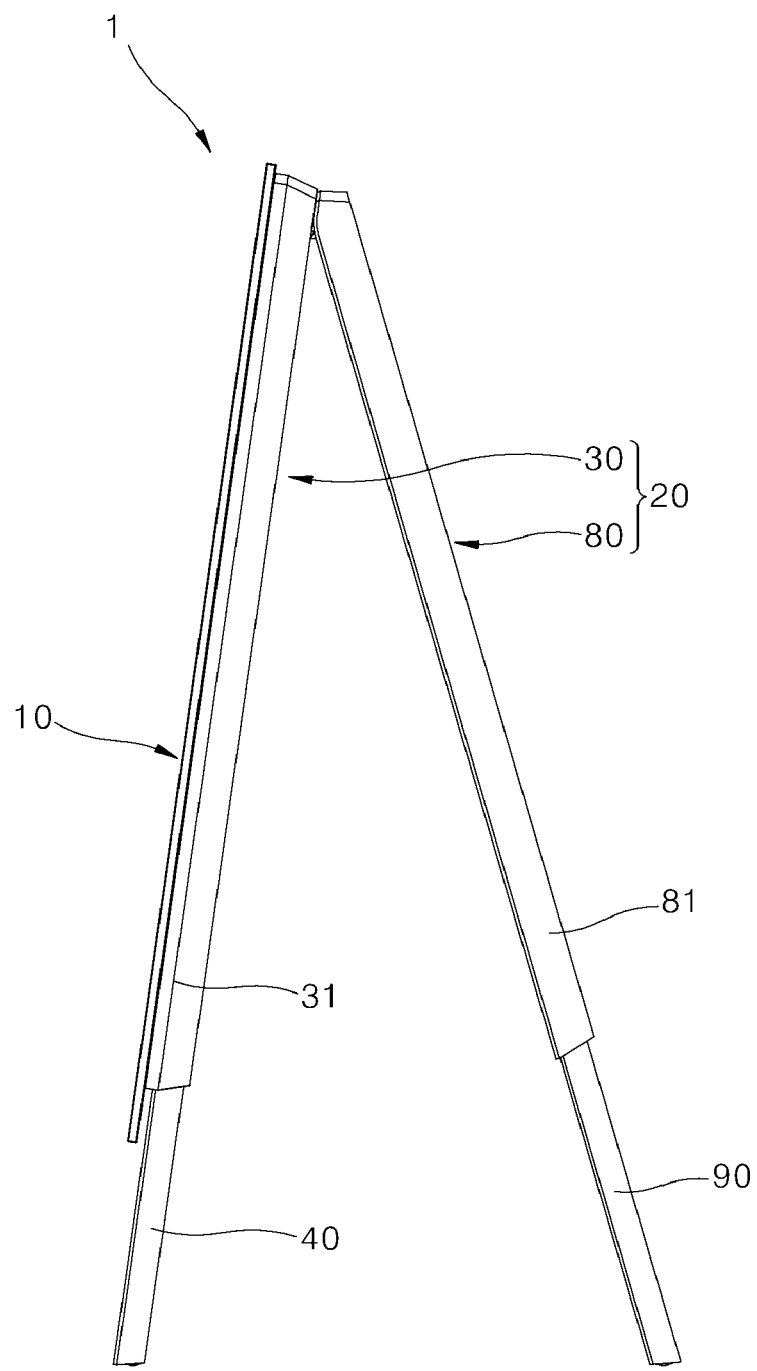
FIG. 4 is a side view of the display apparatus according to the first aspect of the present disclosure.

FIG. 3 is a perspective view showing a state in which the display apparatus 1 according to the first aspect of the present disclosure is separated from a wall hanger 300. FIG. 4 is a side view of the display apparatus 1 according to the first aspect of the present disclosure.

As shown in FIG. 3 to FIG. 5, the support assembly 20 according to the first aspect of the present disclosure may have various modifications as long as it faces the display module 10, and the display module 10 is rotatably supported by the support assembly 20. The support assembly 20 according to the first aspect of the present disclosure may include a first support 30, a second support 80 and a hinge-type connector 130.

The first support 30 and the second support 80 are rotatable around the hinge-type connector 130. An angle between the first support 30 and the second support 80 is within an acute angle range. When an angular spacing between the first support 30 and the second support 80 is within an acute angle, the display apparatus is in a standing mode. Since the bottom of the first support 30 and the second support 80 are disposed toward an installation face, the first support body 31 and the second support body 81 stand on the installation face while the first support body 31 and the second support body 81 pivot around the hinge-type connector 130 and are angularly spaced from each other at a preset angle.

Alternatively, when the first support 30 and the second support 80 are completely folded with each other, the display apparatus 1 is used in a wall mounted mode. Since the wall hanger 300 fixed to a wall is inserted into a hanger receiving groove 82 defined in the second support 80, the display apparatus 1 including the support assembly 20 is fixed to the wall.

[First Support]

The first support 30 may be modified in various ways as long as it is located on the rear side of the display module 10. The first support 30 according to the first aspect of the present disclosure may include at least one of a first support body 31, a first bridge 40, a first bridge guide 50, a first movement switch 60, and a first switch controller 70.

The first support body 31 has a shape facing the display module 10. The first support body 31 according to the first aspect of the present disclosure may have various modifications as long as it is located on the rear side of the display module 10, and the driver assembly 140, the linearly-movable assembly 150, and the connector assembly 200 are installed on the first support body 31. The first support body 31 may have a shape of a plate extending in a vertical direction. An inner opening 32 is defined in the first support body 31. The second movable body 180 disposed on the linearly-movable assembly 150 may be moved up and down along and in the inner opening 32 formed inside the first support body 31.

Figure 7:
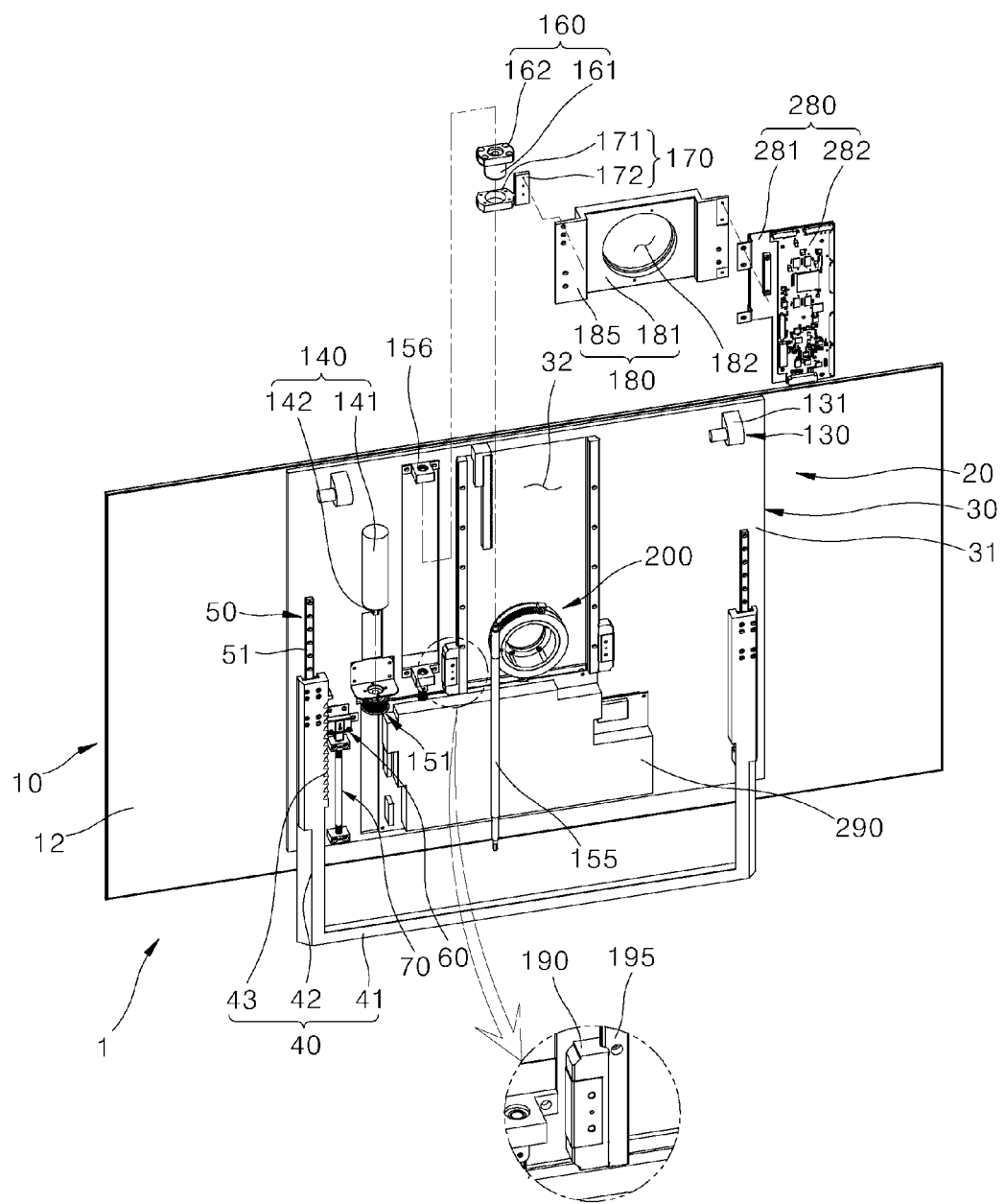
FIG. 7 is an exploded perspective view of a linearly-movable assembly according to the first aspect of the present disclosure.
Figure 9:
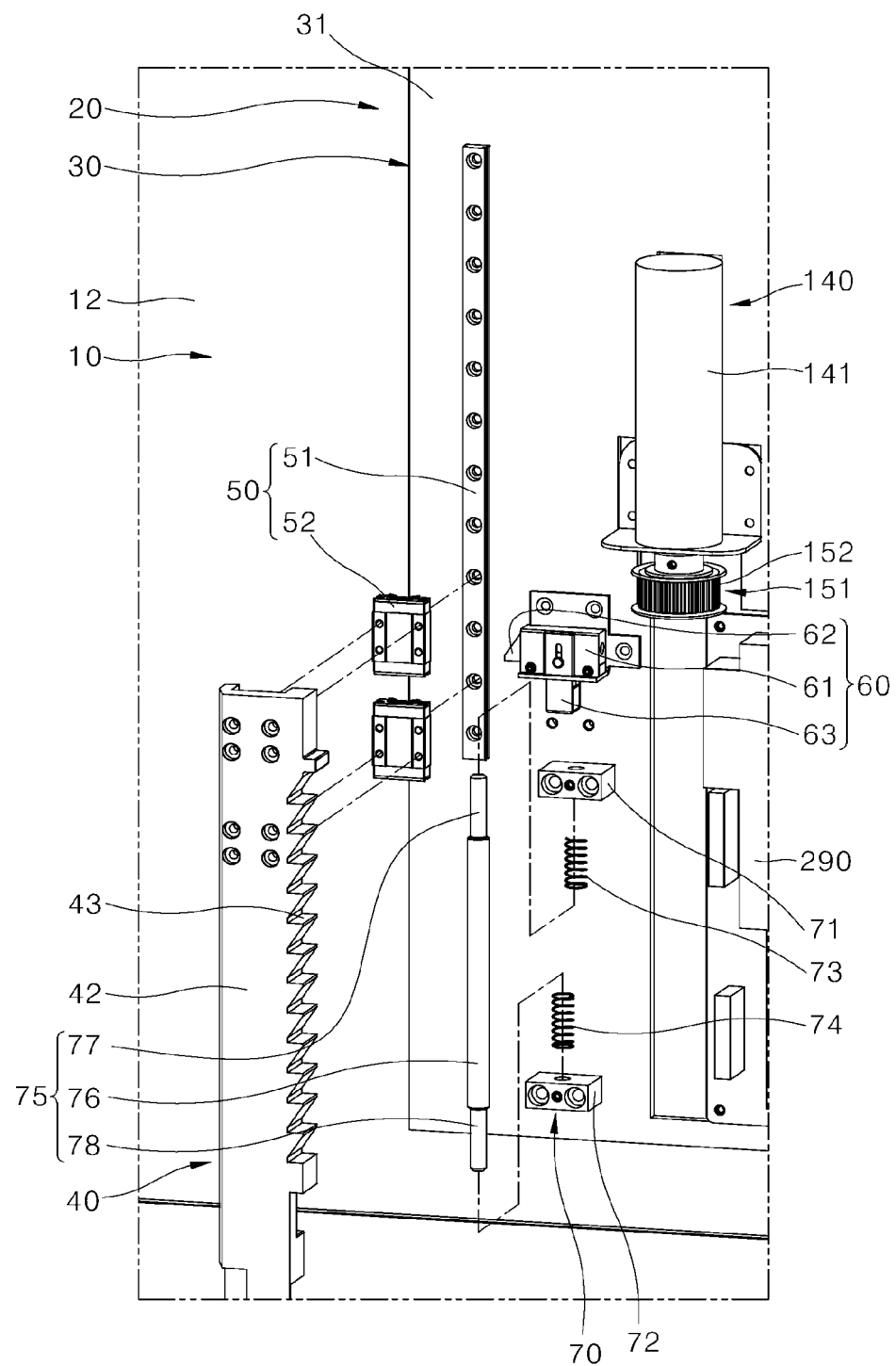
FIG. 9 is a perspective view showing a first bridge guide according to the first aspect of the present disclosure.

FIG. 7 is an exploded perspective view of the linearly-movable assembly 150 according to the first aspect of the present disclosure. FIG. 9 is a perspective view showing the first bridge guide 50 according to the first aspect of the present disclosure.

As shown in FIGS. 7 and 9, the first bridge 40 may be modified in various manners as long as the first bridge 40 is movable outwardly of the first support body 31. The first bridge 40 is slidably installed on the first support body 31, and extends from the first support body 31 or retracts toward the first support body 31. The first bridge 40 according to the first aspect of the present disclosure includes a first bridge body 41, a first side member 42 and a first side gear 43.

The first bridge body 41 extends in a width direction of the first support body 31 (in a left and right direction in FIG. 7). The first bridge body 41 may be embodied as a rod or a plate. When the display apparatus 1 is in a standing mode, the first bridge body 41 moves downwardly of the first support body 31. Further, the first bridge body 41 is bent upwards at both horizontal ends thereof. Thus, the first bridge body 41 has a "U shape. The first bridge body 41 may be modified in various ways.

The first side member 42 extends upwardly of the first bridge body 41, and is connected to the first bridge guide 50 which guides the first bridge 40 in a vertical direction. Therefore, the movement of the first bridge body 41 including the first side member 42 may be stably performed. The first side member 42 is fixed to a first holder 52 of the first bridge guide 50, and may slide together with the first holder 52.

Figure 8:
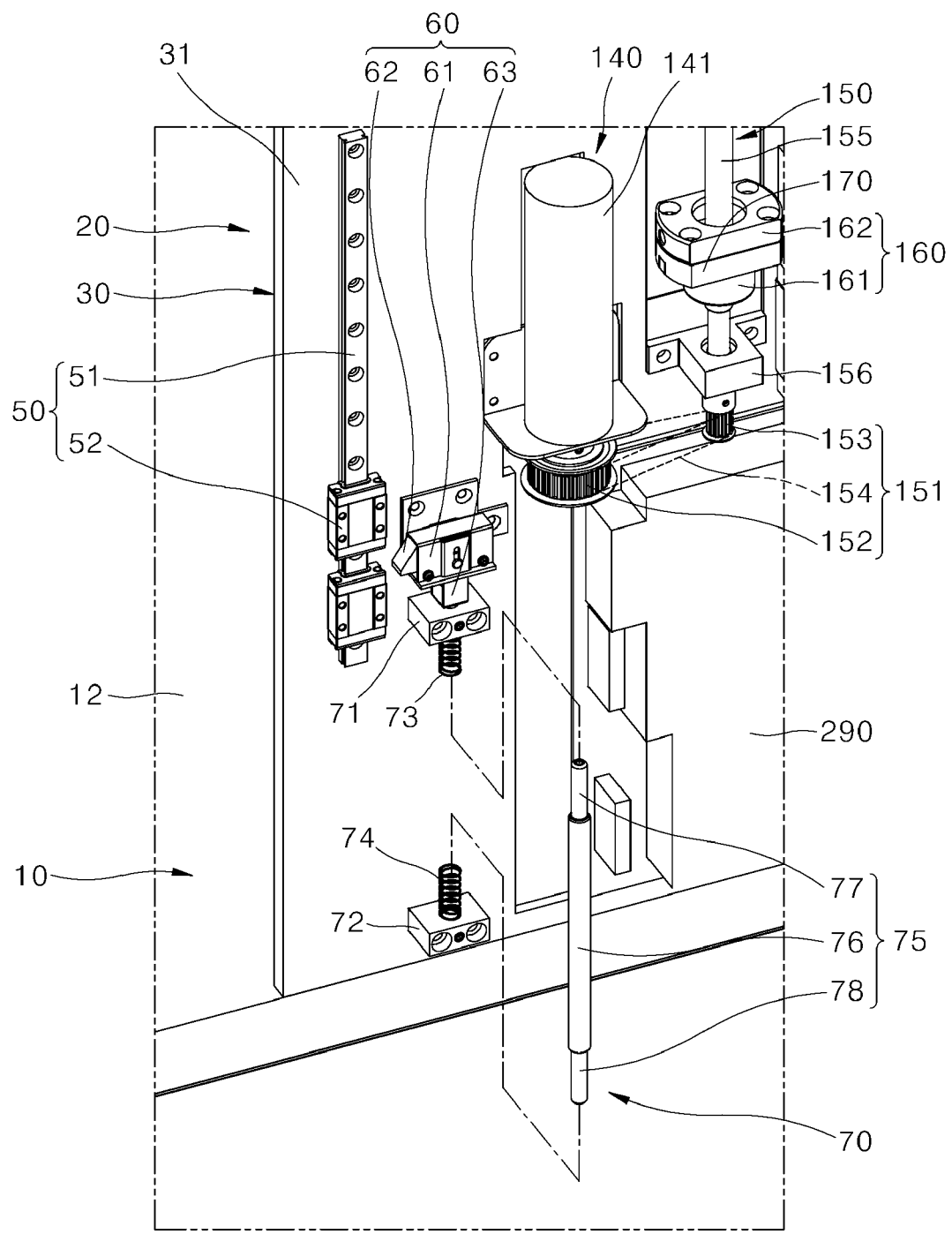
FIG. 8 is a perspective view showing a state in which a first movable bar is separated from a first upper holder according to the first aspect of the present disclosure.

FIG. 8 is a perspective view showing a state where the first movable bar 75 is separated from the first upper holder 71 according to the first aspect of the present disclosure.

As shown in FIGS. 7 to 9, the first bridge guide 50 may have various modifications as long as the first bridge guide 50 is connected to the first support body 31 and the first bridge 40, and guides the linear movement of the first bridge 40. The first bridge guide 50 according to the first aspect of the present disclosure includes a first rail 51 and the first holder 52.

The first rail 51 may have various modifications as long as the first rail 51 is fixed to the first support body 31, and extends along a movement path of the first bridge 40. The first rail 51 according to the first aspect of the present disclosure includes a pair of first rails which is parallel to each other. The first rail 51 is fixed to a side face of the first support body 31, and extends along the path of movement of the first side member 42.

The first holder 52 may be modified in various ways as long as it is supported on the first rail 51 and performs slide movement along the first rail 51. The first holder 52 according to the first aspect of the present disclosure has a block shape, and is installed to be supported on an outer face of the first rail 51. Further, since the first holder 52 is fixed to the first side member 42 disposed on the first bridge 40, the first holder 52 and the first side member 42 slide along the first rail 51.

The first movement switch 60 may be embodied as various types of movement restriction means as long as the first movement switch 60 is installed on the first support body 31 to restrain the movement of the first bridge 40, and movement restriction thereof is disabled by an external force to allow movement of the first bridge 40. The first movement switch 60 according to the first aspect of the present disclosure may include at least one of a first switch body 61, a first switch protrusion 62, and a first actuating protrusion 63.

The first switch body 61 may be modified in various ways as long as it has a first switch protrusion 62 that meshes with the first side gear 43 disposed on a side face of the first bridge 40, and is fixed to the first support body 31.

A first side gear 43 as a spur gear extending along the vertical direction is disposed on a side face of the first side member 42 facing the first switch body 61. The first switch protrusion 62 protruding outwardly of the first switch body 61 engages the first side gear 43, thus restraining the vertical movement of the first bridge 40.

The first actuating protrusion 63 may be embodied as various button type means as long as it protrudes outwardly of the first switch body 61, and moves inwardly of the first switch body 61 to move the first switch protrusion 62. The first actuating protrusion 63 according to the first aspect of the present disclosure protrudes downward of the first switch body 61, and is upwardly pressed toward the first switch body 61 to allow the first switch protrusion 62 to be moved inwardly of the first switch body 61.

Figure 20:
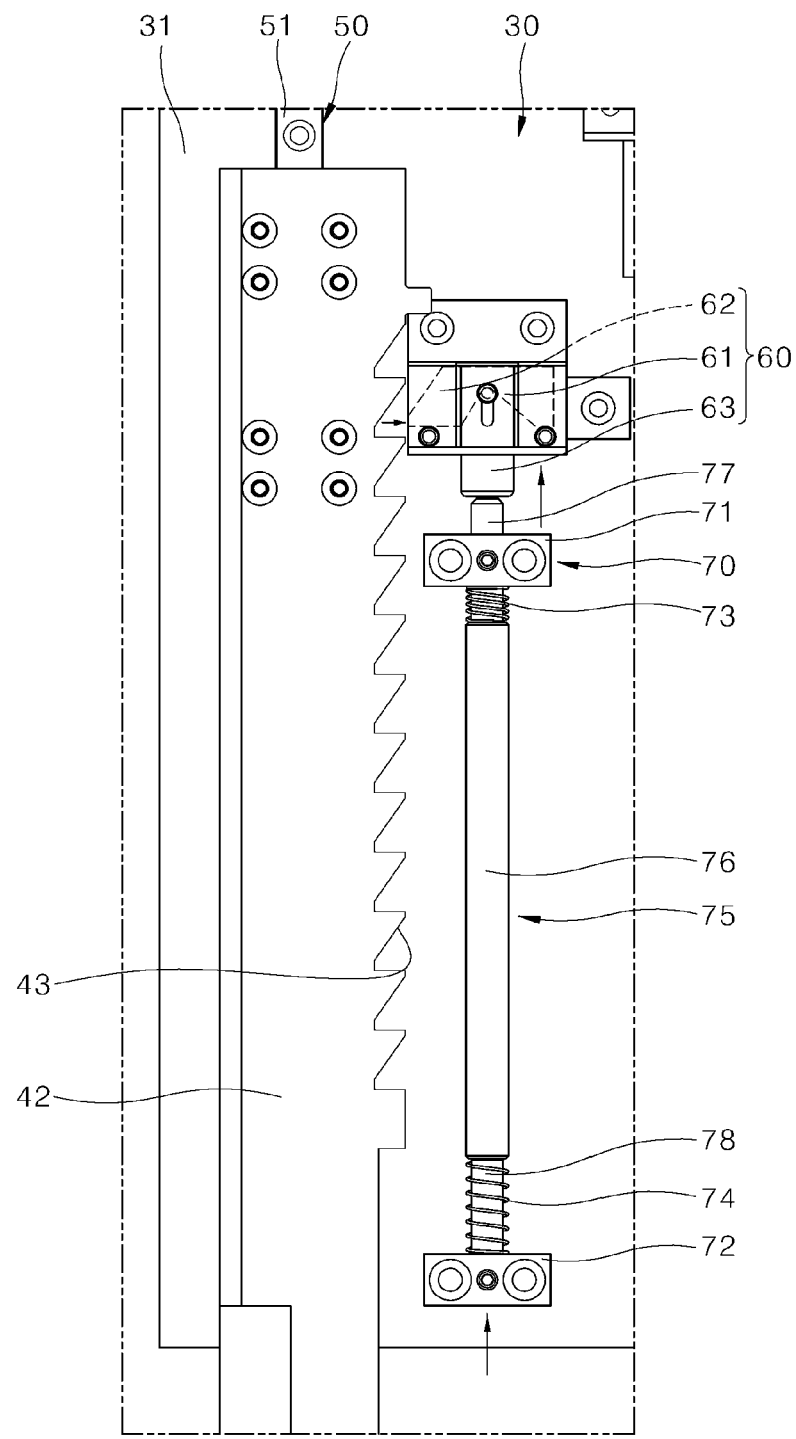
FIG. 20 is a front view showing a state in which a first switch protrusion is moved in a direction away from a first side gear via upward movement of a first movable bar according to the first aspect of the present disclosure.

FIG. 20 is a front view showing a state in which the first switch protrusion 62 is moved away from the first side gear 43 via upward movement of the first movable bar 75 according to the first aspect of the present disclosure.

As shown in FIG. 20, a protrusion that moves up and down together with the first switch protrusion 62 moves up and down along and in a groove defined in the first switch body 61. Thus, an inclined groove defined in the first switch protrusion 62 is pushed by the vertically moving protrusion and moves in the horizontal direction, so that the first switch protrusion 62 may be horizontally moved.

Various types of switching means may be used as long as the first switch protrusion 62 is moved when the first actuating protrusion 63 is pressed. Further, when necessary, each first side gear 43 may be installed on each of left and right first side members 42. Each first movement switch 60 and each first switch controller 70 may be installed to face each first side gear 43.

The first switch controller 70 may have various modifications as long as it is installed to face the first actuating protrusion 63, and is actuated by an external force to pressurize the first actuating protrusion 63. The first switch controller 70 according to one aspect of the present disclosure may include at least one of a first upper holder 71, a first lower holder 72, a first upper elastic member 73, a first lower elastic member 74, and a first movable bar 75.

The first movable bar 75 may be modified in various ways as long as it is installed to face the first actuating protrusion 63, and is moved in a linear direction by an external force. The first movable bar 75 according to the first aspect of the present disclosure includes a first movable body 76, a first upper protrusion 77 and a first lower protrusion 78. The first movable body 76 is embodied as a rod extending in a vertical direction. The first upper protrusion 77 protrudes upward of the first movable body 76. The first lower protrusion 78 protrudes downward from the first movable body 76. An outer diameter of the first movable body 76 is larger than that of the first upper protrusion 77. Further, an outer diameter of the first movable body 76 is larger than that of the first lower protrusion 78. An outer diameter of the first upper protrusion 77 and the outer diameter of the first lower protrusion 78 may be equal to each other.

The first upper holder 71 supports a top of the first movable bar 75. The first upper protrusion 77 may be moved in a vertical direction through a hole defined in the first upper holder 71. The first upper holder 71 may be fixed to the first support body 31, and may guide the vertical movement of the first upper protrusion 77.

The first lower holder 72 supports a bottom of the first movable bar 75. The first lower protrusion 78 may be moved in the vertical direction through a hole defined in the first lower holder 72. The first lower holder 72 may be fixed to the first support body 31, and may guide the vertical movement of the first lower protrusion 78.

A top of the first upper elastic member 73 is in contact with the first upper holder 71. A bottom of the first upper elastic member 73 is supported on the first movable bar 75. Further, the first upper elastic member 73 presses the first movable bar 75 downward using an elastic force thereof. The first upper elastic member 73 may be embodied as a coil spring. The bottom of the first upper elastic member 73 may contact a top of the first movable body 76.

A top of the first lower elastic member 74 is supported on the first movable bar 75. A bottom of the first lower elastic member 74 contacts the first lower holder 72. Further, the first lower elastic member 74 presses the first movable bar 75 upward via an elastic force thereof. The first lower elastic member 74 may be embodied as a coil spring. The top of the first upper elastic member 73 may contact the bottom of the first movable body 76.

[Second Support]

Figure 13:
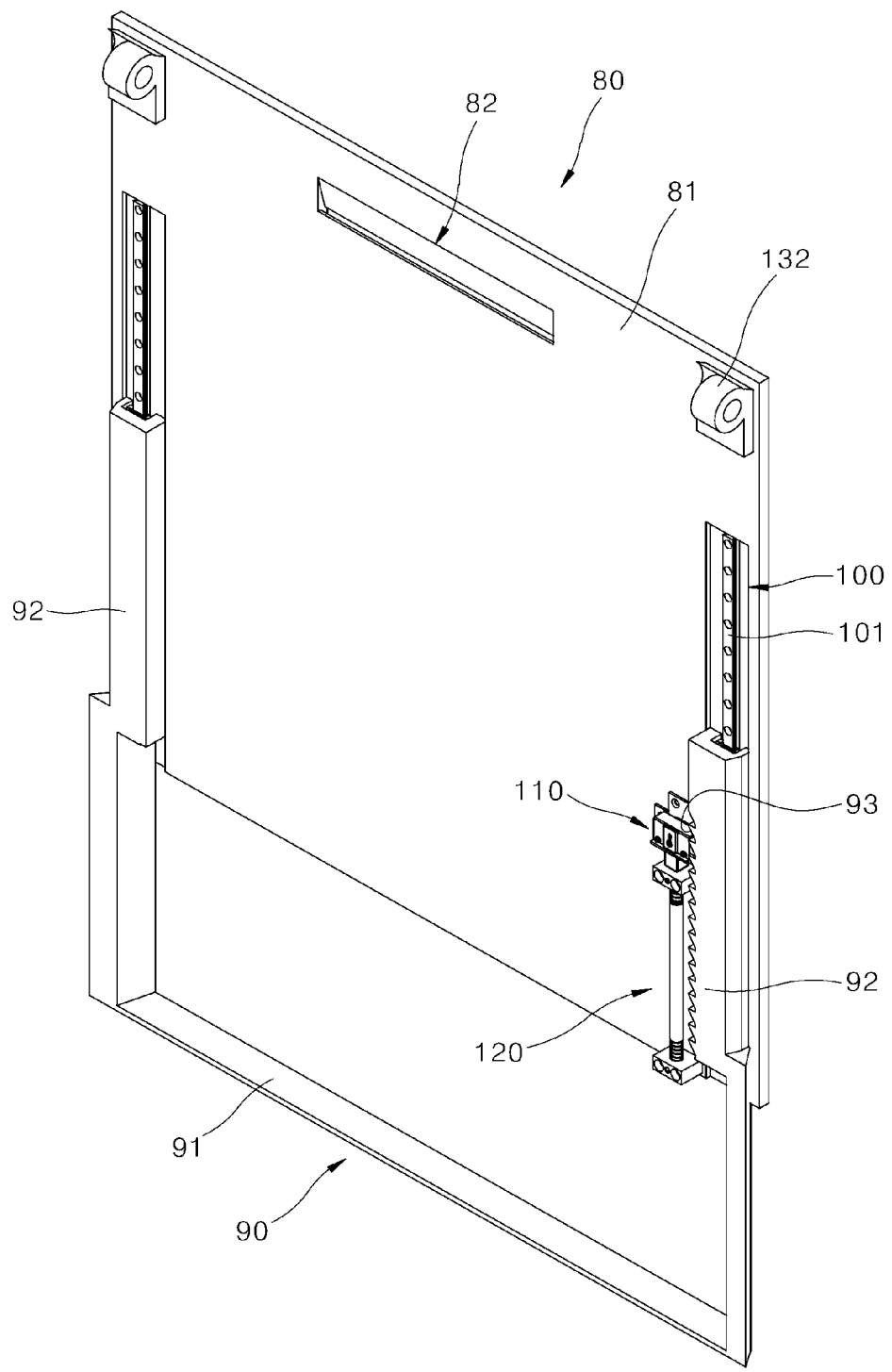
FIG. 13 is a perspective view showing a second support according to the first aspect of the present disclosure.
Figure 14:
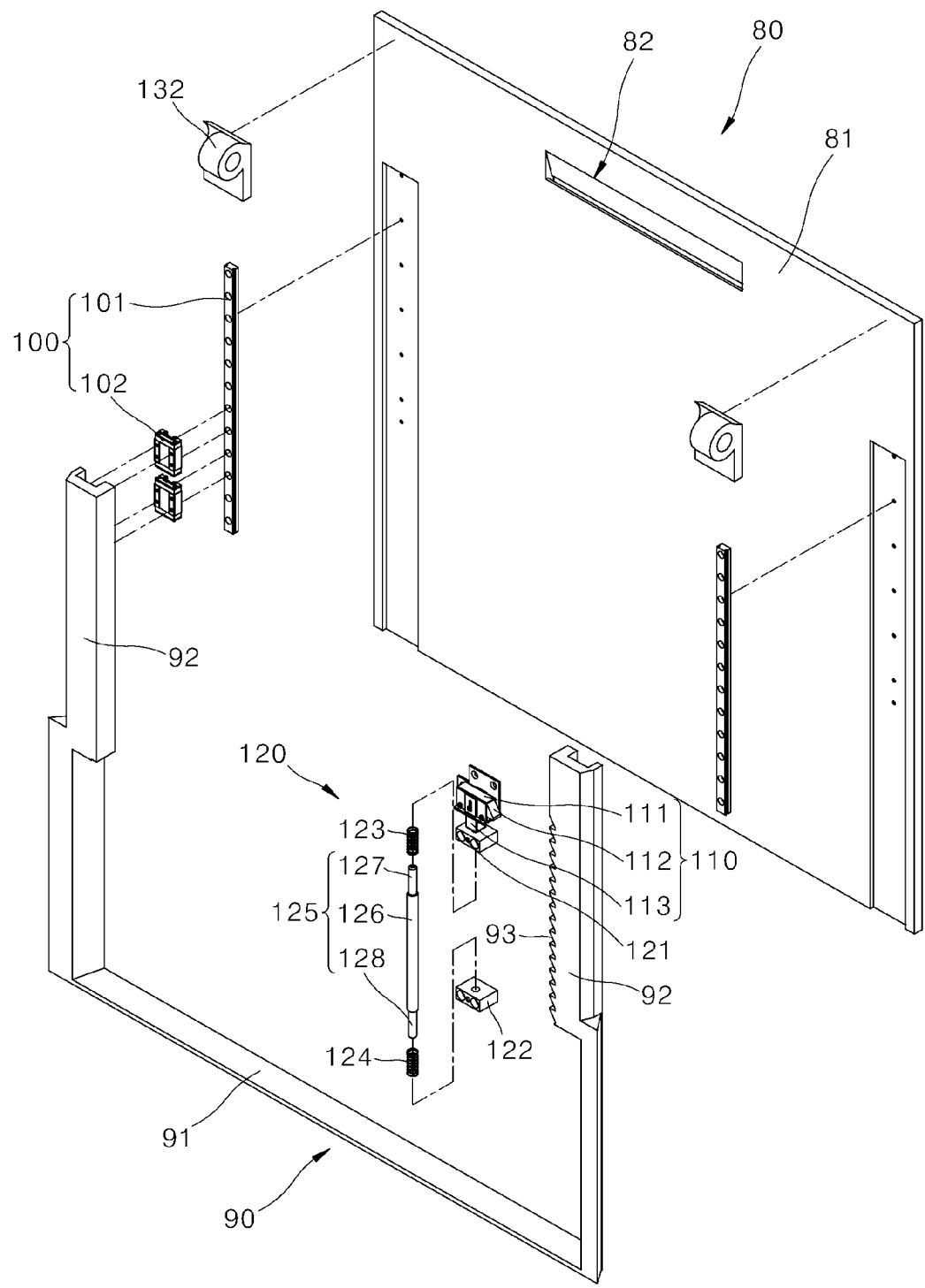
FIG. 14 is an exploded perspective view of the second support according to the first aspect of the present disclosure.

FIG. 13 is a perspective view showing the second support 80 according to the first aspect of the present disclosure. FIG. 14 is an exploded perspective view of the second support 80 according to the first aspect of the present disclosure.

As shown in FIG. 13 and FIG. 14, the second support 80 may be modified in various ways as long as it is installed to face the first support 30. The second support 80 according to the first aspect of the present disclosure may include at least one of a second support body 81, a second bridge 90, a second bridge guide 100, a second movement switch 110, and a second switch controller 120.

The second support body 81 has a shape facing the first support 30. The second support body 81 according to the first aspect of the present disclosure may have various modifications as long as it is connected to the first support body 31 via the hinge-type connector 130, and a hanger receiving groove 82 into which the wall hanger 300 is inserted is defined in the second support body 81. The second support body 81 may be embodied as a plate extending in a vertical direction.

The hanger receiving groove 82 for receiving the wall hanger 300 therein may be defined in the side face of the second support body 81. The hanger receiving groove 82 according to the first aspect of the present disclosure may be embodied as a stripe-shaped groove defined in a rear side of the second support body 81 and extending in a horizontal direction. Alternatively, the hanger receiving groove 82 may be embodied as a concave groove toward the inside of the second support body 81, such that the wall hanger 300 may be easily caught in the hanger receiving groove 82.

The second bridge 90 may be extendable from or retractable toward the second support body 81. The second bridge guide 100 may be connected to the second support body 81 and the second bridge 90, and guide the linear movement of the second bridge 90.

The second bridge 90 may be modified in various manner as long as the second bridge 90 is extendable from or retractable toward the second support body 81. The second bridge 90 may slide on the second support body 81, and may be extendable from or retractable toward the second support body 81. The second bridge 90 according to the first aspect of the present disclosure includes a second bridge body 91, a second side member 92, and a second side gear 93.

The second bridge body 91 extends in a width direction of the second support body 81 (in a left and right direction in FIG. 14). The second bridge body 91 may be embodied as a rod or plate. When the display apparatus 1 is in the standing mode, the second bridge body 91 moves downwardly of the second support body 81. Further, the second bridge body 91 is bent upward at both side ends thereof. Thus, the second bridge body 91 has a "U shape. The second bridge body 91 may be modified in various ways.

The second side member 92 extends upwardly of the second bridge body 91, and is connected to the second bridge guide 100 which guides the second bridge 90 in the vertical direction. Therefore, the movement of the second bridge body 91 including the second side member 92 may be stably performed. The second side member 92 may be fixed to the second holder 102 of the second bridge guide 100, and may perform slide movement together with the second holder 102.

The second bridge guide 100 may have various modifications as long as it is connected to the second support body 81 and the second bridge 90, and guides the linear movement of the second bridge 90. The second bridge guide 100 according to the first aspect of the present disclosure includes a second rail 101 and a second holder 102.

The second rail 101 may have various modifications as long as it is fixed to the second support body 81, and extends along the movement path of the second bridge 90. The second rail 101 according to the first aspect of the present disclosure includes a pair of second rails which are parallel to each other. The second rail 101 is fixed to the side face of the second support body 81 and extends along the movement path of the second side member 92.

The second holder 102 may be modified in various ways as long as it is supported on the second rail 101, and performs slide movement along the second rail 101. The second holder 102 according to the first aspect of the present disclosure has a block shape, and is supported on an outer face of the second rail 101. Further, since the second holder 102 is fixed to the second side member 92 disposed on the second bridge 90, the second holder 102 and the second side member 92 may slide along the second rail 101.

The second movement switch 110 may be embodied as various types of movement restriction means as long as the second movement switch 110 is installed on the second support body 81 to restrain the movement of the second bridge 90, and movement restriction thereof is disabled by an external force to allow movement of the second bridge 9. The second movement switch 110 according to the first aspect of the present disclosure may include at least one of a second switch body 111, a second switch protrusion 112, and a second actuating protrusion 113.

The second switch body 111 may be modified in various ways as long as it has a second switch protrusion 112 engaging a second side gear 93 disposed on to side face of the second bridge 90, and is fixed to the second support body 81.

The second side gear 93 as a spur gear extending in the vertical direction is disposed on the side face of the second side member 92 facing the second switch body 111. The second switch protrusion 112 protruding outwardly of the second switch body 111 engages the second side gear 93, thus restraining the vertical movement of the second bridge 90.

The second actuating protrusion 113 may be embodied as various button type means as long as it protrudes outwardly of the second switch body 111, and moves inwardly of the second switch body 111 to move the second switch protrusion 112. The second actuating protrusion 113 according to the first aspect of the present disclosure protrudes downward of the second switch body 111, and is upwardly pressed toward the second switch body 111 to allow the second switch protrusion 112 to be moved inwardly of the second switch body 111.

A protrusion that moves up and down together with the second switch protrusion 112 moves up and down along and in a groove defined in the second switch body 111. Thus, an inclined groove defined in the second switch protrusion 112 is pushed by the vertically moving protrusion and moves in the horizontal direction, so that the second switch protrusion 112 may be horizontally moved.

Various types of switching means may be used as long as the second switch protrusion 112 is moved in the horizontally when the second actuating protrusion 113 is pressed. Further, when necessary, each second side gear 93 may be installed on each of left and right second side members 92. Each second movement switch 110 and each second switch controller 120 may be installed to face each second side gear 93.

The second switch controller 120 may have various modifications as long as it is installed to face the second actuating protrusion 113, and is actuated by an external force to pressurize the second actuating protrusion 113. The second switch controller 120 according to one aspect of the present disclosure may include at least one of a second upper holder 121, a second lower holder 122, a second upper elastic member 123, a second lower elastic member 124, and a second movable bar 125.

The second movable bar 125 may be modified in various ways as long as it is installed to face the second actuating protrusion 113, and is moved in a linear direction by an external force. The second movable bar 125 according to the first aspect of the present disclosure includes a second movable body 126, a second upper protrusion 127 and a second lower protrusion 128. The second movable body 126 is embodied as a rod extending in a vertical direction. The second upper protrusion 127 protrudes upward of the second movable body 126. The second lower protrusion 128 protrudes downward from the second movable body 126. An outer diameter of the second movable body 126 is larger than that of the second upper protrusion 127. Further, an outer diameter of the second movable body 126 is larger than that of the second lower protrusion 128. An outer diameter of the second upper protrusion 127 and the outer diameter of the second lower protrusion 128 may be equal to each other.

The second upper holder 121 supports a top of the second movable bar 125. The second upper protrusion 127 may be moved in a vertical direction through a hole defined in the second upper holder 121. The second upper holder 121 may be fixed to the second support body 81, and may guide the vertical movement of the second upper protrusion 127.

The second lower holder 122 supports a bottom of the second movable bar 125. The second lower protrusion 128 may be moved in the vertical direction through a hole defined in the second lower holder 122. The second lower holder 122 may be fixed to the second support body 81, and may guide the vertical movement of the second lower protrusion 128.

A top of the second upper elastic member 123 is in contact with the second upper holder 121. A bottom of the second upper elastic member 123 is supported on the second movable bar 125. Further, the second upper elastic member 123 presses the second movable bar 125 downward using an elastic force thereof. The second upper elastic member 123 may be embodied as a coil spring. The bottom of the second upper elastic member 123 may contact a top of the second movable body 126.

A top of the second lower elastic member 124 is supported on the second movable bar 125. A bottom of the second lower elastic member 124 contacts the second lower holder 122. Further, the second lower elastic member 124 presses the second movable bar 125 upward via an elastic force thereof. The second lower elastic member 124 may be embodied as a coil spring. The top of the second upper elastic member 123 may contact the bottom of the second movable body 126.

[Hinge-Type Connector]

The hinge-type connector 130 may be modified in various ways as long as it is connected to the first support 30 and the second support 80, and is installed to be rotatable. The hinge-type connector 130 according to the first aspect of the present disclosure includes a first connector member 131 connected to a top of the first support 30 and a second connector member 132 connected to a top of the second support 80. Since the first connector member 131 is rotatably coupled to the second connector member 132, the second connector member 132 and the second support 80 may pivot around the first connector member 131.

[Driver Assembly]

The driver assembly 140 may have various modifications as long as it is installed on the support assembly 20, and provides power to rotate the display module 10. The driver assembly 140 according to the first aspect of the present disclosure includes a driving motor 141 and a driving shaft 142. A transmission may be installed at the driving motor 141. The driving motor 141 may be embodied as a servo motor. Alternatively, other types of electric motors that generate rotating power using electric energy may also be used as the driving motor 141. An output shaft may be directly connected to the driving motor 141. The driving shaft 142 may be coupled to an output of the transmission that receives power from the driving motor 141 and changes a rotation speed. This driver assembly 140 may be fixedly installed on a rear face of the first support 30.

[Linearly-Movable Assembly]

Figure 6:
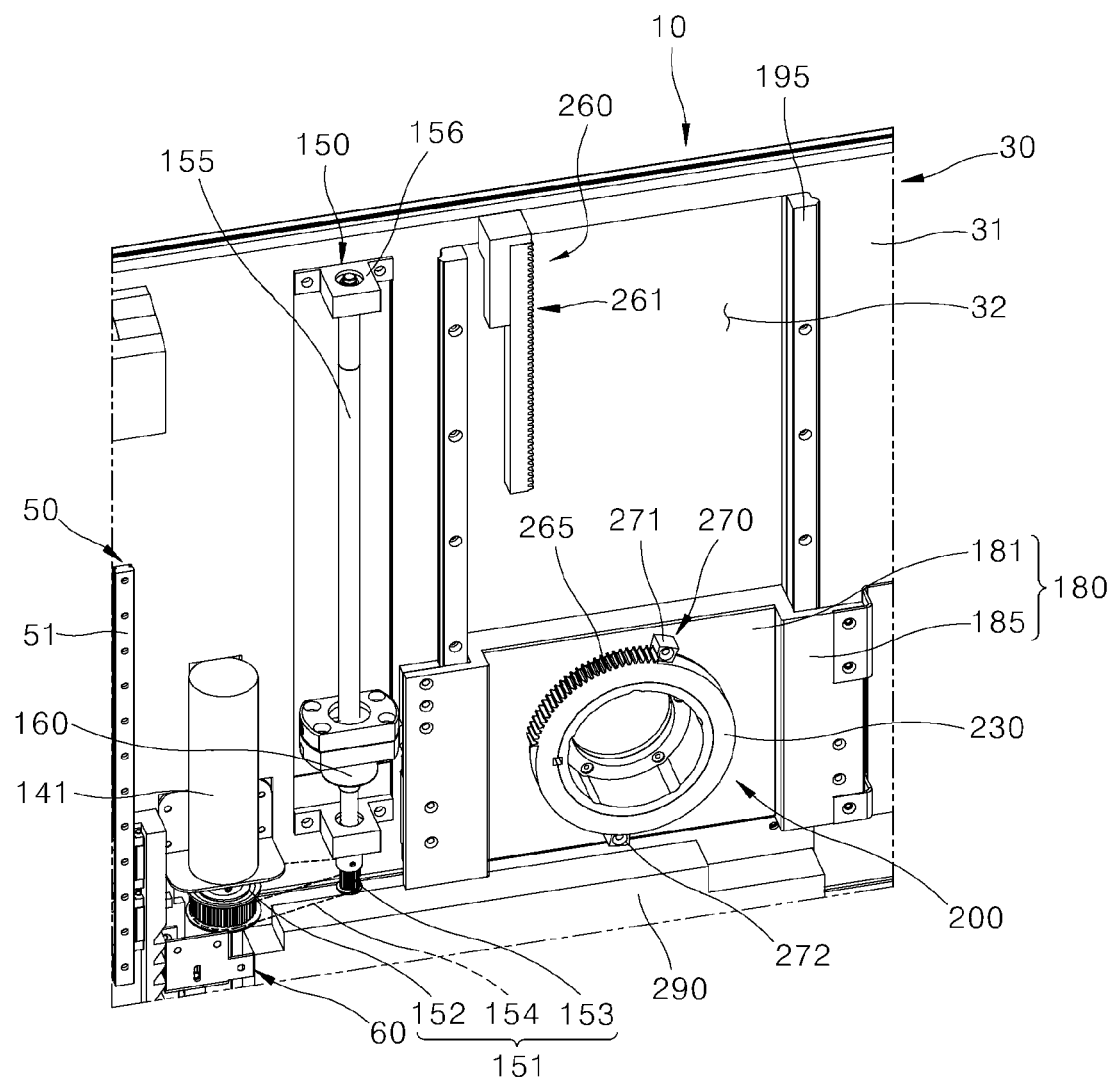
FIG. 6 is a perspective view showing a driver assembly and a linearly-movable assembly according to the first aspect of the present disclosure.

FIG. 6 is a perspective view showing the driver assembly 140 and the linearly-movable assembly 150 according to the first aspect of the present disclosure.

As shown in FIG. 5 and FIG. 6, the linearly-movable assembly 150 may have various modifications as long as it is connected to the driver assembly 140 to receive power therefrom and performs linear movement along the support assembly 20. The linearly-movable assembly 150 according to the first aspect of the present disclosure may include at least one of a power transmitter 151, a screw bar 155, a bearing holder 156, a ball nut 160, a first movable body 170, and a second movable body 180.

As long as the power transmitter 151 transmits the power of the driver assembly 140 to the screw bar 155, various types of power transmission devices may be used as the power transmitter 151. The power transmitter 151 according to the first aspect of the present disclosure may include a driving gear 152, a driven gear 153 and a belt 154.

The driving gear 152 is connected to the driving shaft 142 of the driver assembly 140 and rotates together with the driving shaft 142. A gear is formed on an outer face of the driving gear 152 and along a circumferential direction thereof. The driven gear 153 is axially connected to the screw bar 155. A gear is formed on an outer face of the driven gear 153 and along a circumferential direction thereof. The belt 154 connects the driving gear 152 and the driven gear 153 to each other and transmits the power therebetween. The belt 154 has a gear formed along an inner face thereof meshing with each of the driving gear 152 and the driven gear 153.

The screw bar 155 may be modified in various ways as long as it rotates upon receiving the power of the driver assembly 140, and threads are formed om an outer face of the screw bar. The screw bar 155 according to the first aspect of the present disclosure extends in the vertical direction as the longitudinal direction of the first support 30, and has a rod shape.

Each bearing holder 156 is installed on each of both ends of the screw bar 155 and supports the screw bar 155 such that the screw bar is rotatable. The bearing holder 156 is fixed to a rear side of the first support 30. A bearing is installed on an inner face thereof facing the screw bar 155. Each bearing holder 156 according to the first aspect of the present disclosure supports each of a top and a bottom of the screw bar 155 such that the screw bar is rotatable.

The ball nut 160 may have various modifications as long as it engages the thread and is installed on an outer face of the screw bar 155, and it moves in a linear direction along the screw bar 155 under the rotation of the screw bar 155. The ball nut 160 according to the first aspect of the present disclosure includes a ball nut body 161 and a wing 162.

The ball nut body 161 extends in the vertical direction. A hollow is defined in the ball nut body 161 such that the screw bar 155 extends through the hollow in the vertical direction. A female thread is formed on an inner face of the ball nut body 161 facing the screw bar 155, and is engaged with a male thread formed on an outer face of the screw bar 155.

The wing 162 is embodied as a plate extending outwardly of the ball nut body 161. A linearly-movable body 171 of the first movable body 170 is fixed to the wing 162.

The first movable body 170 may be modified in various ways as long as it is coupled to the ball nut 160 and moves in a linear direction together with the ball nut 160. The first movable body 170 according to the first aspect of the present disclosure may include the linearly-movable body 171 and an extended bracket 172.

The linearly-movable body 171 may be modified in various ways as long as it is coupled to the ball nut 160 and moves up and down together with the ball nut 160. The linearly-movable body 171 according to the first aspect of the present disclosure has a hollow defined therein through which the screw bar 155 moves and is in a face-contact with the wing 162.

The extended bracket 172 protrudes outwardly of the linearly-movable body 171 and is fixed to the second movable body 180. Therefore, one end of the first movable body 170 is fixed to the ball nut 160, while the other end of the first movable body 170 is fixed to the second movable body 180. Thus, the first movable body 170, the ball nut 160 and the second movable body 180 move up and down together.

The second movable body 180 may have various modifications as long as it is connected to the first movable body 170 and moves in a linear manner together with the first movable body 170 and supports the connector assembly 200 such that the connector assembly is rotatable. The second movable body 180 according to the first aspect of the present disclosure may include a slidable body 181 and a side member 185.

The slidable body 181 has an opening 182 to receive the connector assembly 200 fixed to the display module 10 such that the connector assembly is rotatable. The slidable body 181 has a plate shape, and moves up and down along and in the inner opening 32. A hole in a circular hole shape is formed inside the slidable body 181.

The side member 185 extends from both sides of the slidable body 181. The movable block 190 and the first movable body 170 are connected to the side member 185. The side member 185 forms a step with the slidable body 181, and is connected to the slidable body 181.

Two linear rails 195 form a pair and extend in a vertical direction and in parallel to each other. Two movable blocks 190 form a pair and are supported on outer faces of the linear rails 195, respectively. Therefore, the movement of the movable blocks 190 may be made more stably. The vertical movement of the second movable body 180 fixed to the movable blocks 190 may be achieved stably.

The movable block 190 may be modified in various ways as long as each movable block 190 is supported on an outer face of each linear rail 195, and is slidable along each linear rail 195. Further, the movable block 190 is fixed to the side member 185 of the second movable body 180.

[Connector Assembly]

Figure 10:
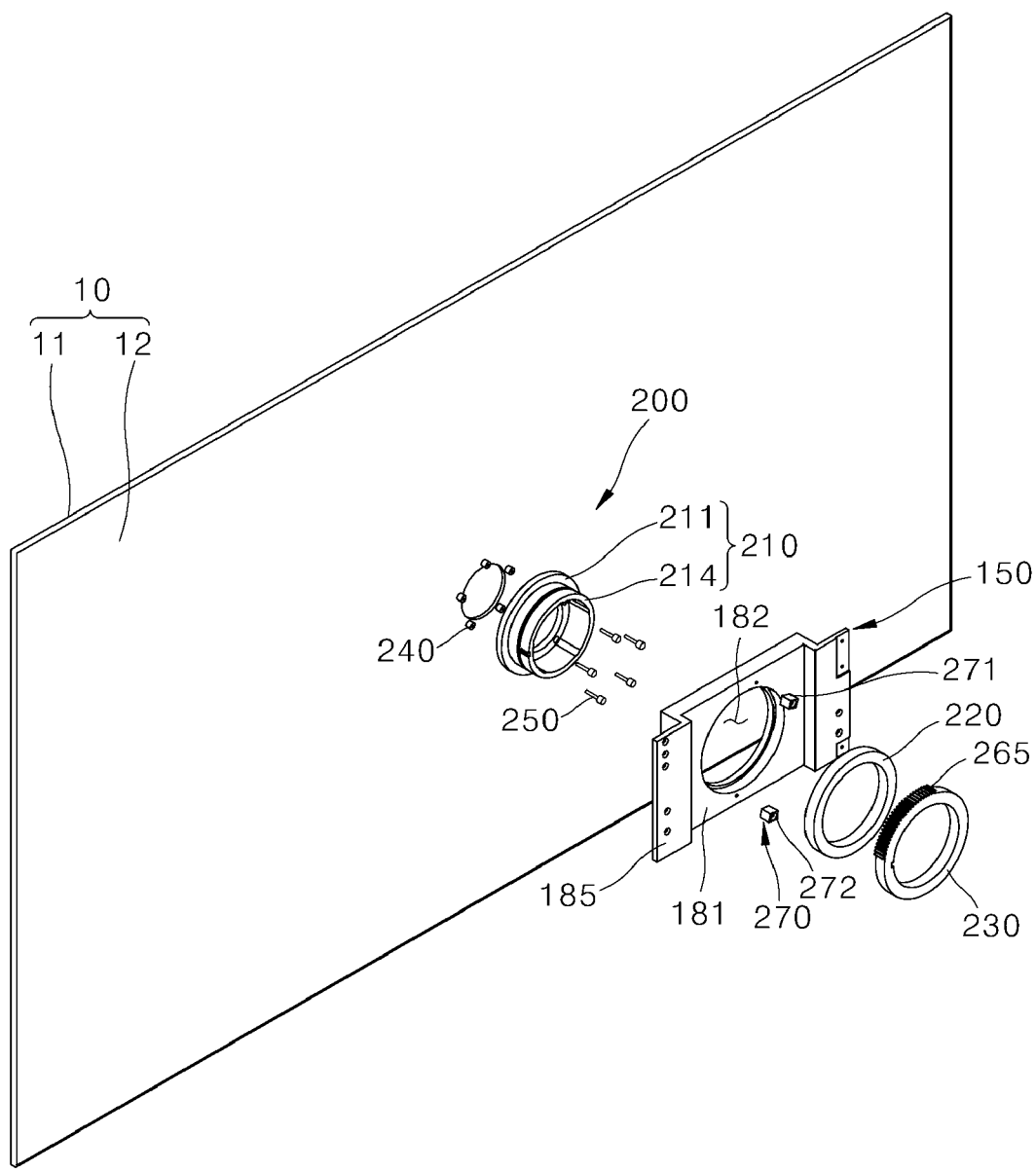
FIG. 10 is a perspective view showing a state in which a second movable body is located on a rear side of the display module according to the first aspect of the present disclosure.
Figure 11:
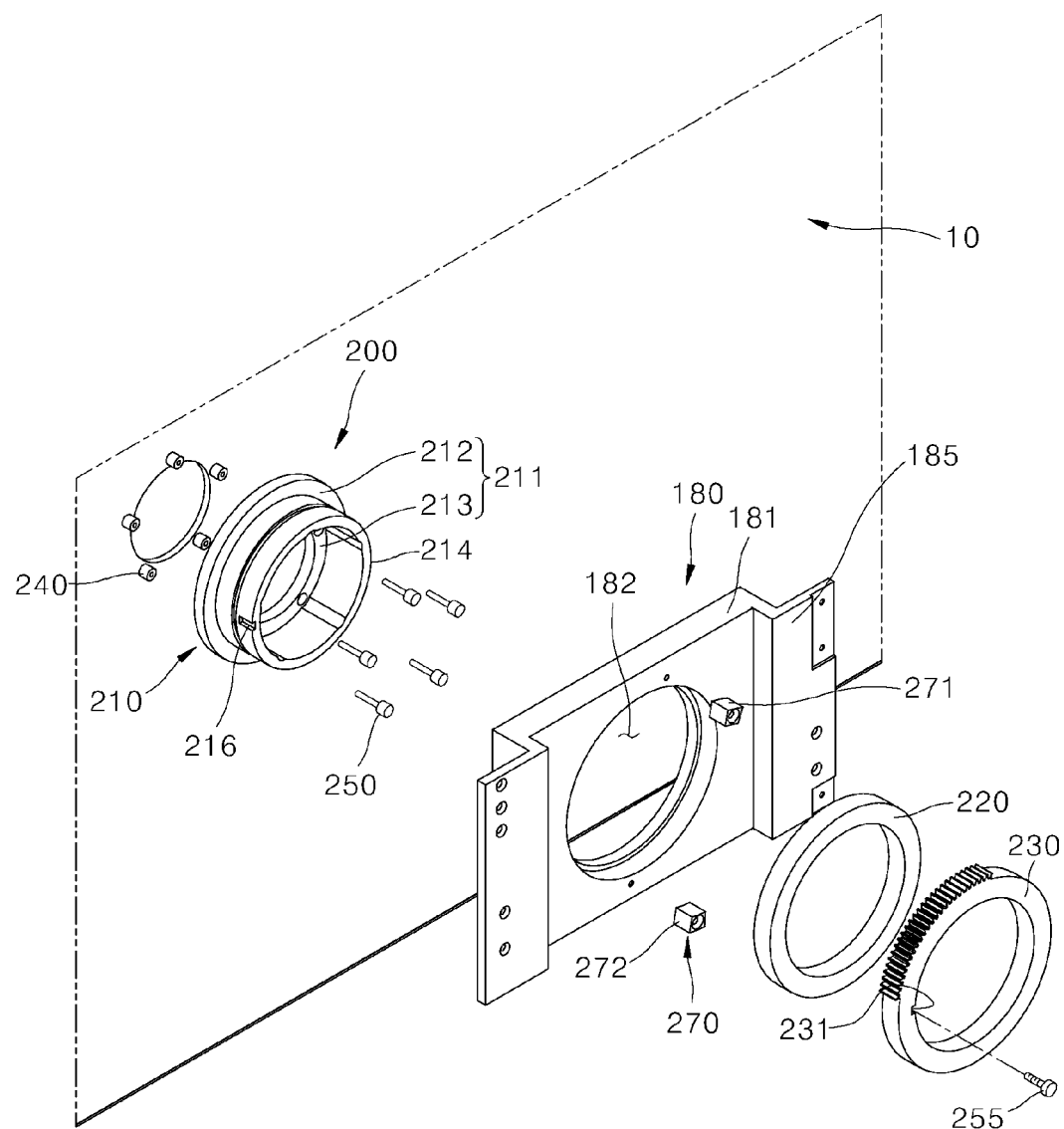
FIG. 11 is an exploded perspective view of a second movable body according to the first aspect of the present disclosure.
Figure 12:
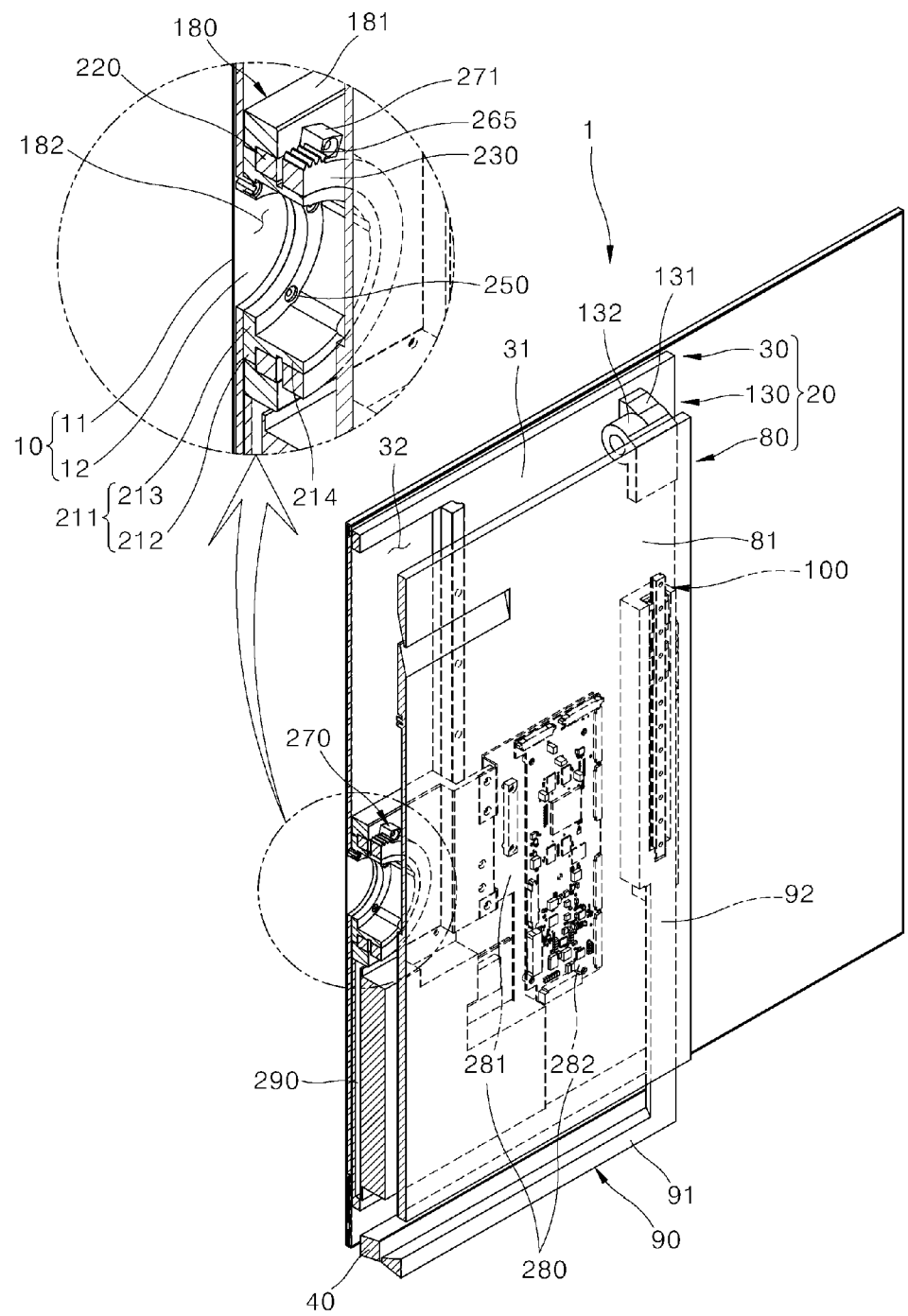
FIG. 12 is a partial cut-away perspective view showing a state in which a connector assembly is installed on a display module according to the first aspect of the present disclosure.

FIG. 10 is a perspective view showing a state in which the second movable body 180 is located on the rear side of the display module 10 according to the first aspect of the present disclosure. FIG. 11 is an exploded perspective view of the second movable body 180 according to the first aspect of the present disclosure. FIG. 12 is a partially cut-away perspective view showing a state in which the connector assembly 200 according to the first aspect of the present disclosure is installed on the display module 10.

As shown in FIG. 10 to FIG. 12, the connector assembly 200 may be modified in various ways as long as one end of the connector assembly 200 is fixed to the display module 10, while the other end of the connector assembly 200 is rotatably installed on the linearly-movable assembly 150. The connector assembly 200 according to the first aspect of the present disclosure may include at least one of a swing bracket 210, an annular bearing 220, a rotatable connector 230, connecting protrusions, 240 and a fastener 250.

The swing bracket 210 may have various modifications as long as it is fixed to the display module 10 facing the first support 30, and is rotatably connected to the linearly-movable assembly 150. The swing bracket 210 according to the first aspect of the present disclosure includes a base 211 and a swing bracket body 214.

The base 211 has a hollow plate shape and is fixed to the support panel 12 of the display module 10. The swing bracket body 214 extending in a perpendicular manner to the base 211 may be embodied as a circular pipe. The swing bracket body 214 is fixed to base 211. The base 211 may include an outer base 212 located outwardly of the swing bracket body 214, and an inner base 213 located inwardly of the swing bracket body 214.

The swing bracket body 214 is rotatably installed on the slidable body 181 of the second movable body 180. Further, an outer groove 216 may be additionally defined in an outer face of the swing bracket body 214 protruding outwardly of the slidable body 181. A separate fastening member 255 may be inserted into the outer groove 216.

The annular bearing 220 may have various modifications as long as it is installed on an outer face of swing bracket 210, and reduces a frictional force generated when the swing bracket 210 rotates. The annular bearing 220 according to the first aspect of the present disclosure has a ring shape, and is located between the swing bracket 210 and the linearly-movable assembly 150. The annular bearing located inside the opening 182 is fixedly press-fitted onto an outer face of the swing bracket 210. Further, since the annular bearing 220 is supported on the inner base 213, the annular bearing 220 and the swing bracket 210 are prevented from being deviated in a front direction of the first support 30.

The rotatable connector 230 may be modified in various ways as long as it is fixed to the swing bracket 210 protruding outwardly of the linearly-movable assembly 150, and rotates together with the swing bracket 210. The rotatable connector 230 according to the first aspect of the present disclosure has a ring shape. An inner groove 231 is defined in the rotatable connector 230 in an inner face thereof facing the outer groove 216.

Since the bolt-shaped fastening member 255 is inserted into between the outer groove 216 and the inner groove 231, the rotation of the swing bracket 210 and the rotation of the rotatable connector 230 is synchronized with each other.

In one example, the connecting protrusions 240 may be formed on the support panel 12 located on the rear side of the display module 10. The connecting protrusions 240 are inserted into the base 211. While the base 211 is coupled to the connecting protrusions 240, the fastener 250 is fixed to the connecting protrusions 240 through the base 211. Therefore, the swing bracket 210 is fixed to the display module 10.

The annular bearing 220 is fixedly pressure-fitted onto an outer face of the swing bracket body 214. The rotatable connector 230 is installed on the annular bearing 220. The rotatable connector 230 is fixedly pressure-fitted onto an outer face of the swing bracket body 214. The fastening member 255 having threads formed thereon is inserted into a space defined between the outer groove 216 and the inner groove 231 to fix the rotatable connector 230 to an outer face of the swing bracket body 214.

[Guide Mechanism]

Figure 16:
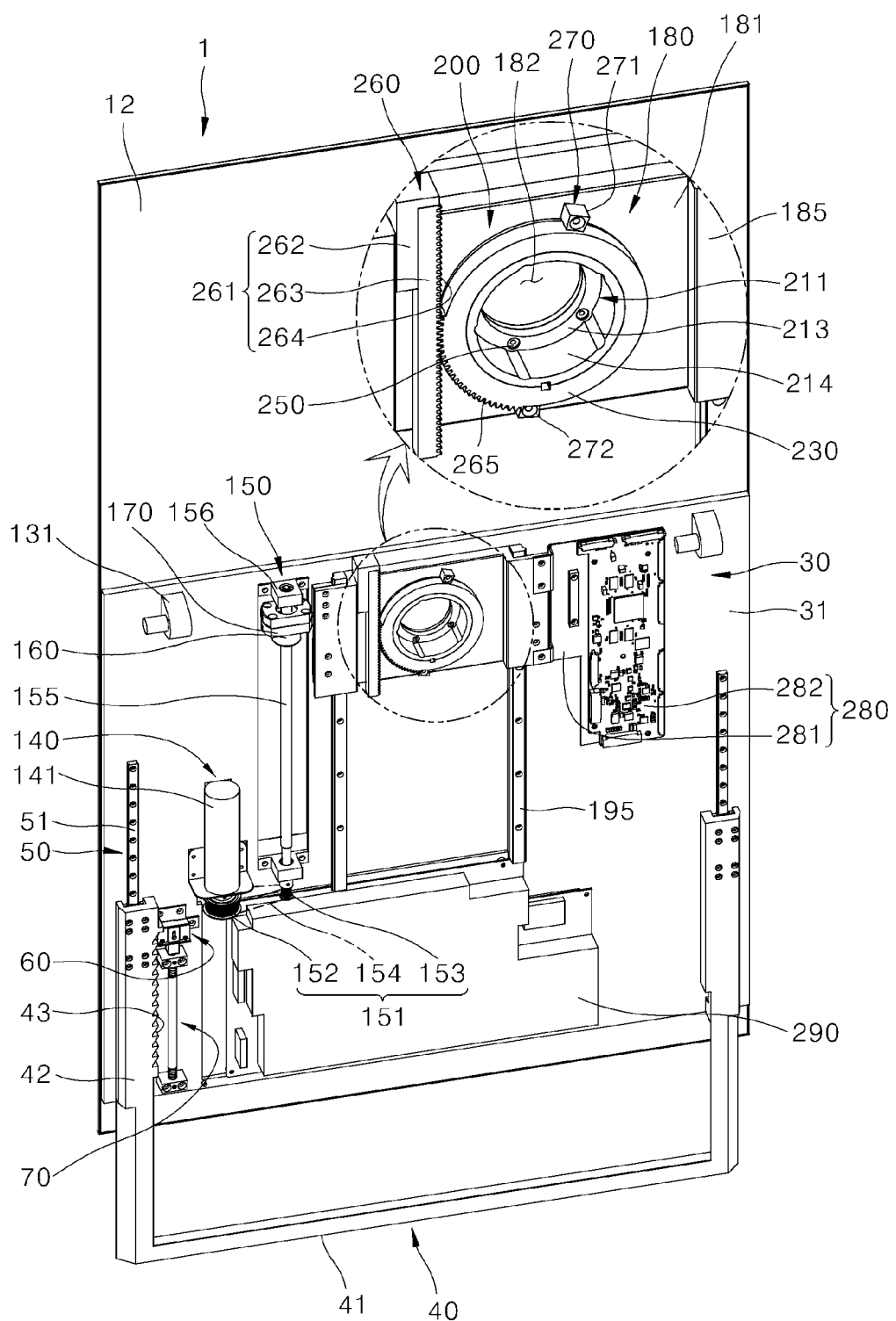
FIG. 16 is a perspective view showing a state in which a circular gear is in contact with a second stopper according to the first aspect of the present disclosure.
Figure 17:
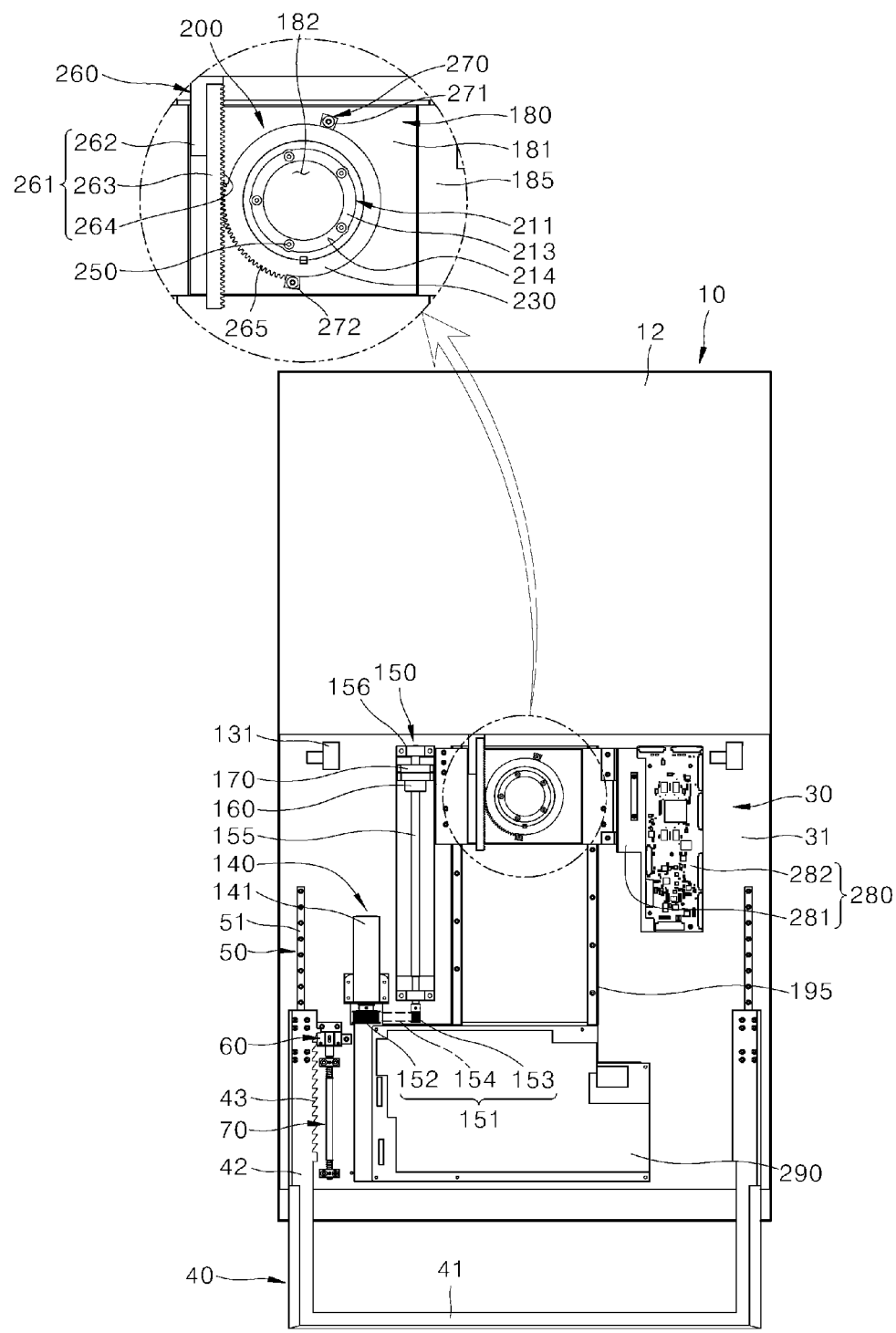
FIG. 17 is a front view showing a state in which a circular gear contacts the second stopper according to the first aspect of the present disclosure.

FIG. 16 is a perspective view showing a state in which a circular gear 265 is in contact with a second stopper 272 according to the first aspect of the present disclosure. FIG. 17 is a front view showing a state in which the circular gear 265 is in contact with the second stopper 272 according to the first aspect of the present disclosure.

As shown in FIGS. 16 and 17, the guide mechanism 260 may have various modifications as long as it is connected to the connector assembly 200 and the support assembly 20, and rotates the connector assembly 200 under movement of the linearly-movable assembly 150. The guide mechanism 260 according to the first aspect of the present disclosure may include at least one of a linear gear 261, the circular gear 265 and a stopper 270.

The linear gear 261 may have various modifications as long as it is fixed to the first support 30, and has threads formed on a side face thereof meshing with the circular gear 265 and moving in a vertical direction. One portion of the linear gear 261 is fixed to the first support 30, while the other portion of the linear gear 261 extends in a longitudinal direction of the first support 30. The linear gear 261 according to the first aspect of the present disclosure may include at least one of a linear gear bracket 262, a linear gear body 263, and linearly arranged threads 264.

The linear gear bracket 262 is fixed to the first support 30. Further, the linear gear bracket 262 supports the linear gear body 263 extending in a longitudinal direction of the first support 30. The linear gear body 263 has a rod shape. A top of the linear gear body 263 is fixed to the linear gear bracket 262.

The linearly arranged threads 264 as a spur gear are formed on a side face of the linear gear body 263 facing the circular gear 265.

The circular gear 265 may be modified in various ways as long as it extends along and on an outer circumference of the rotatable connector 230. The circular gear 265 according to the first aspect of the present disclosure may be formed only on a predefined section of the outer circumference of the rotatable connector 230. The predefined section where the circular gear 265 is formed may correspond to an angular range on which the display module 10 is rotated. For example, when the rotation angle range of the display module 10 is set to 0 to 90 degrees, the circular gear 265 may be formed only on a section corresponding to a 0 to 90 degrees angle range of the outer circumference of the rotatable connector 230.

The circular gear 265 may be integrally formed on an outer face of rotatable connector 230, and may be moved up and down linearly together with the swing bracket 210 combined with the rotatable connector 230. The circular gear 265 may mesh with the linear gear 261, and may rotate together with the display module 10.

The stopper 270 is fixed to the swing bracket 210 and is located at a movement path of the circular gear 265. Further, the stopper 270 may have various modifications as long as the stopper 270 allow the rotation of the circular gear 265 to occur within the predefined angle range. The stopper 270 according to the first aspect of the present disclosure may include a first stopper 271 and a second stopper 272.

The first stopper 271 protrudes outwardly of the swing bracket 210, and is engaged with one end of the circular gear 265 to restrain the rotation of the circular gear 265. The first stopper 271 may be embodied as a protrusion protruding outwardly of the swing bracket 210. The first stopper 271 may be engaged with one end of the circular gear 265 protruding outwardly of the circular gear 265, thereby to disallow the circular gear 265 from rotating beyond the predefined rotation angle range.

The second stopper 272 is spaced apart from the first stopper 271 and protrudes outwardly of the swing bracket 210. The second stopper 272 is engaged with the other end of the circular gear 265 to restrain the rotation of the circular gear 265. The second stopper 272 may be embodied as a protrusion protruding outwardly of the swing bracket 210 like the first stopper 271. The stopper is engaged with the other end of the circular gear 265 protruding outwardly of the circular gear 265 to disallow the rotation of the circular gear 265 beyond the predefined rotation angle range.

[Movable Controller]

As long as the movable controller 280 is connected to the swing bracket 210 and moves in the vertical direction together with the swing bracket 210, various modifications thereof are possible. The movable controller is connected to the display module 10 to control the operation of the display module 10. The movable controller 280 according to the first aspect of the present disclosure may include a movable bracket 281 and a movable controller body 282.

The movable bracket 281 is connected to the side member 185 of the second movable body 180. The movable bracket 281 and the side member 185 move together in a vertical direction. Further, the movable controller body 282 is connected to the movable bracket 281. The display module 10 and the movable controller body 282 are connected to each other using cables. Power and signals are transmitted therebetween through the cables. Since the movable controller 280 may move up and down together with the display module 10, it is possible to prevent damage to the cable due to interference or separation due to the vertical movement of the display module 10.

[Fixed Controller]

The fixed controller 290 may have various modifications as long as it is fixed to the first support 30, and is connected to at least one of the display module 10 and the movable controller 280, and controls the operation of the display module 10. The fixed controller 290 according to the first aspect of the present disclosure is fixed to the first support body 31 and is connected to the movable controller 280 via a cable. A weight of the fixed controller 290 is greater than a weight of the movable controller 280. A volume of the fixed controller 290 is larger than that of the movable controller 280.

The movable controller 280 may perform operations related to control of the display module 10. The fixed controller 290 controls the operation of the driver assembly 140, and receives an external signal and controls the operation of the display module 10 together with the movable controller 280.

Further, the fixed controller 290 may perform a function of transmitting external power and external signals to the display module 10 or the movable controller 280. The operations of the movable controller 280 and the fixed controller 290 may vary as needed.

Since the movable controller 280 and the fixed controller 290 are separated from each other, a time and a cost required for maintenance and part replacement may be saved. Further, the weight of the display module 10 is reduced, such that rotation of the display module 10 may be carried out more easily.

The display module 10 according to the first aspect of the present disclosure may be applied to a relatively light OLED module. The display module 10 may be moved in a vertical direction under the movement of the linearly-movable assembly 150, and may rotate in the predefined rotation angle range via the guide mechanism 260.

Therefore, when a mobile phone screen is output to the display module 10, the display module 10 is viewed in the second mode. When the user view a movie or views a general TV image, the display module 10 is viewed in the first mode.

[Operation of Display Apparatus According to First Aspect]

Hereinafter, an operation state of the display apparatus 1 according to the first aspect of the present disclosure will be described in detail with reference to the accompanying drawings.

Figure 15:
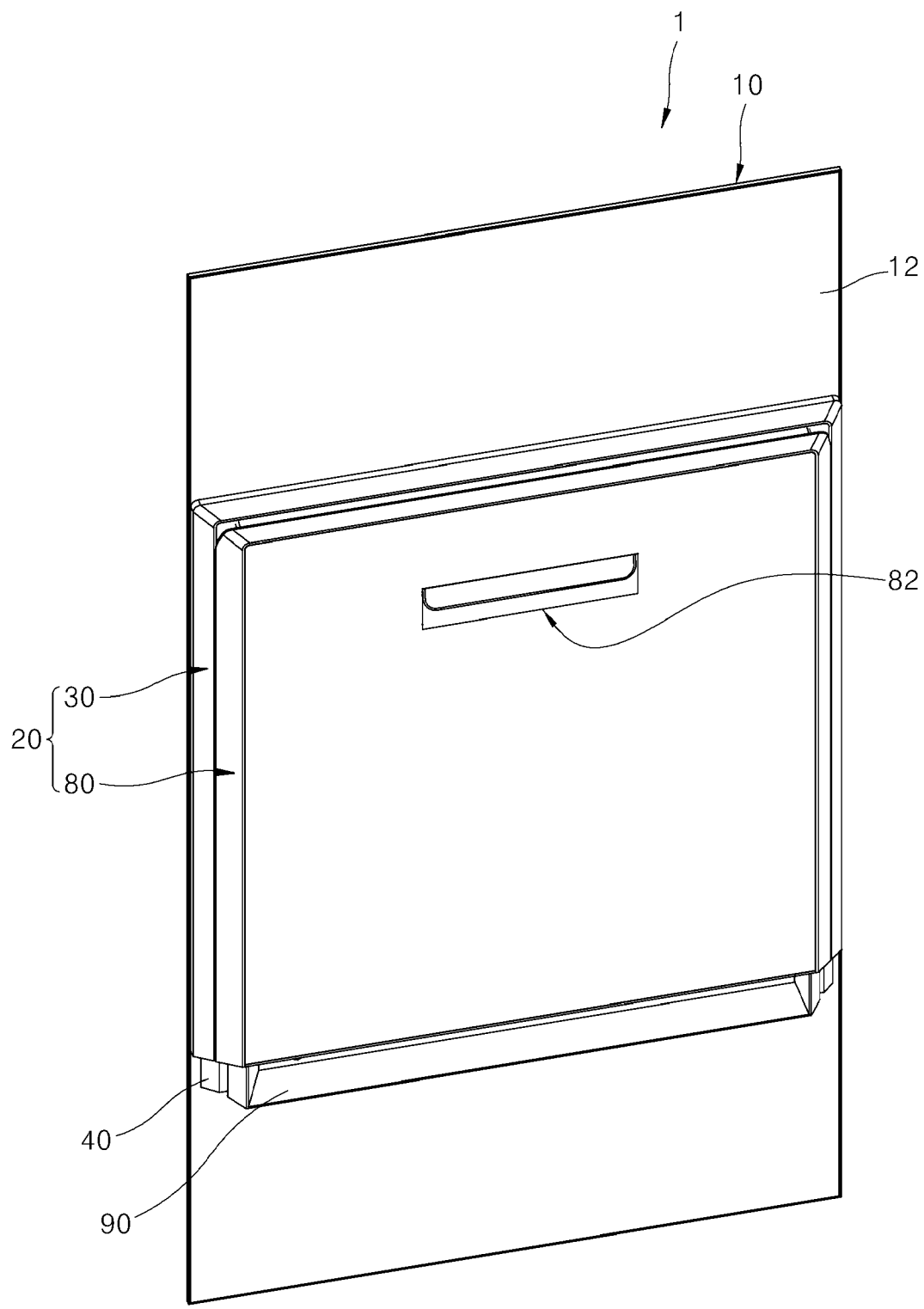
FIG. 15 is a perspective view showing a display module in a portrait mode according to the first aspect of the present disclosure.

FIG. 15 is a perspective view showing that the display module 10 according to the first aspect of the present disclosure is in the portrait mode.

As shown in FIG. 15 and FIG. 17, when the user views the display module 10 in the second mode, that is, the portrait viewing mode, the circular gear 265 is stopped by the second stopper 272. The second movable body 180 supporting the swing bracket 210 to be rotatable is located at a top of the linear rail 195.

The first movable body 170 and the ball nut 160 moving in the vertical direction together with the second movable body 180 are located at a top of the screw bar 155.

Figure 18:
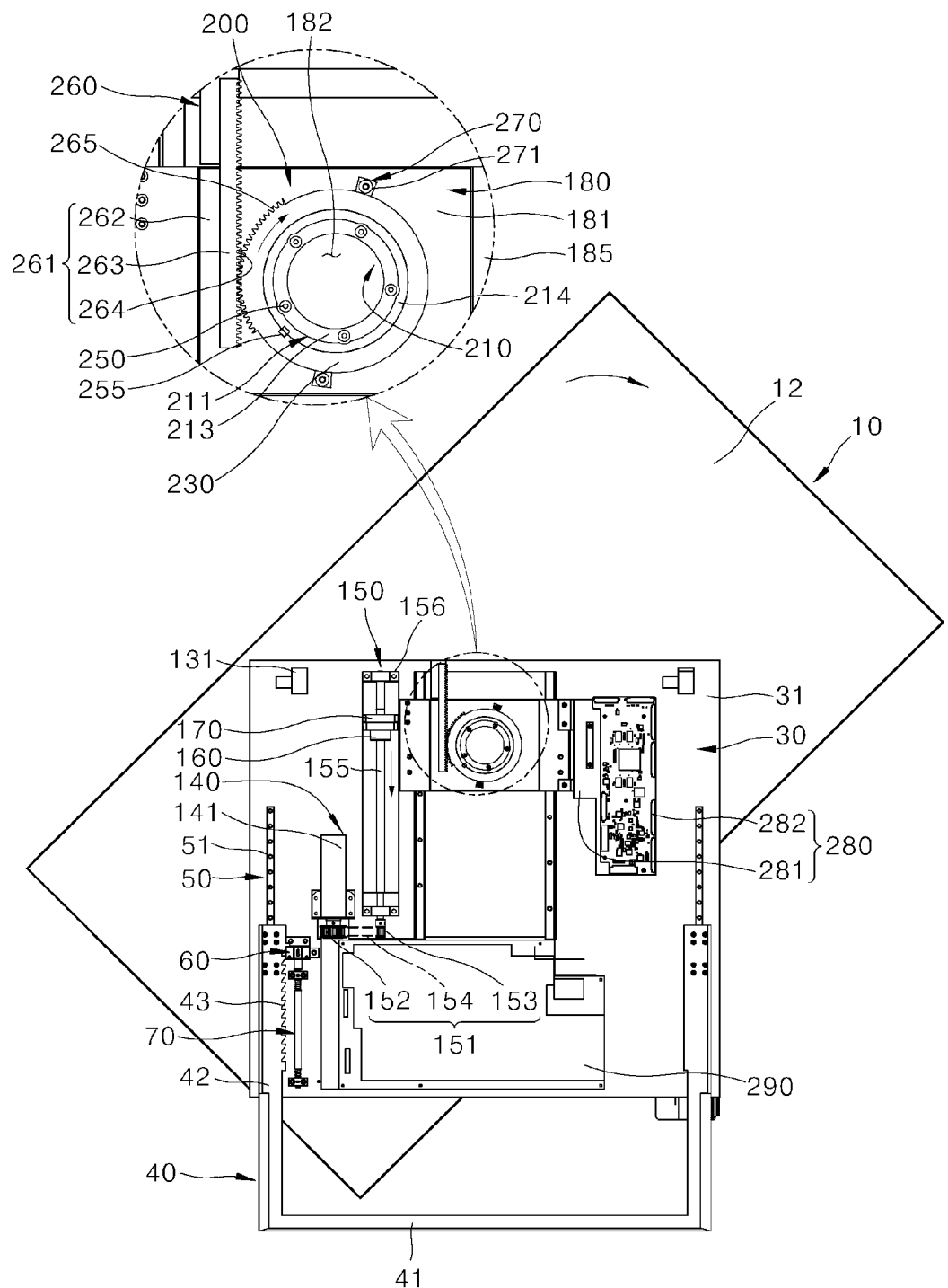
FIG. 18 is a front view showing a state in which a circular gear rotates while meshing with a linear gear according to the first aspect of the present disclosure.

FIG. 18 is a front view showing a state in which the circular gear 265 is rotated while being engaged with the linear gear 261 according to the first aspect of the present disclosure.

As shown in FIG. 18, when the driving motor 141 is activated, power is transmitted to the screw bar 155 through the power transmitter 151 such that the screw bar 155 is rotated. The ball nut 160 as restricted in rotation is moved vertically in a straight line under the rotation of the screw bar 155. When the ball nut 160 moves downward, the first movable body 170 moves downward together with the ball nut 160. Further, when the second movable body 180 connected to the first movable body 170 moves downward, the circular gear 265 located on the outer face of the rotatable connector 230 rotatably installed on the second movable body 180 rotates while engaging with the linearly arranged threads 264.

As the linearly arranged threads 264 rotate clockwise, the display module 10 together with the circular gear 265 rotates clockwise. As the swing bracket 210 moves downward, the circular gear 265 engages with the linearly arranged threads 264 and rotates so that the display module 10 further rotates clockwise.

Figure 19:
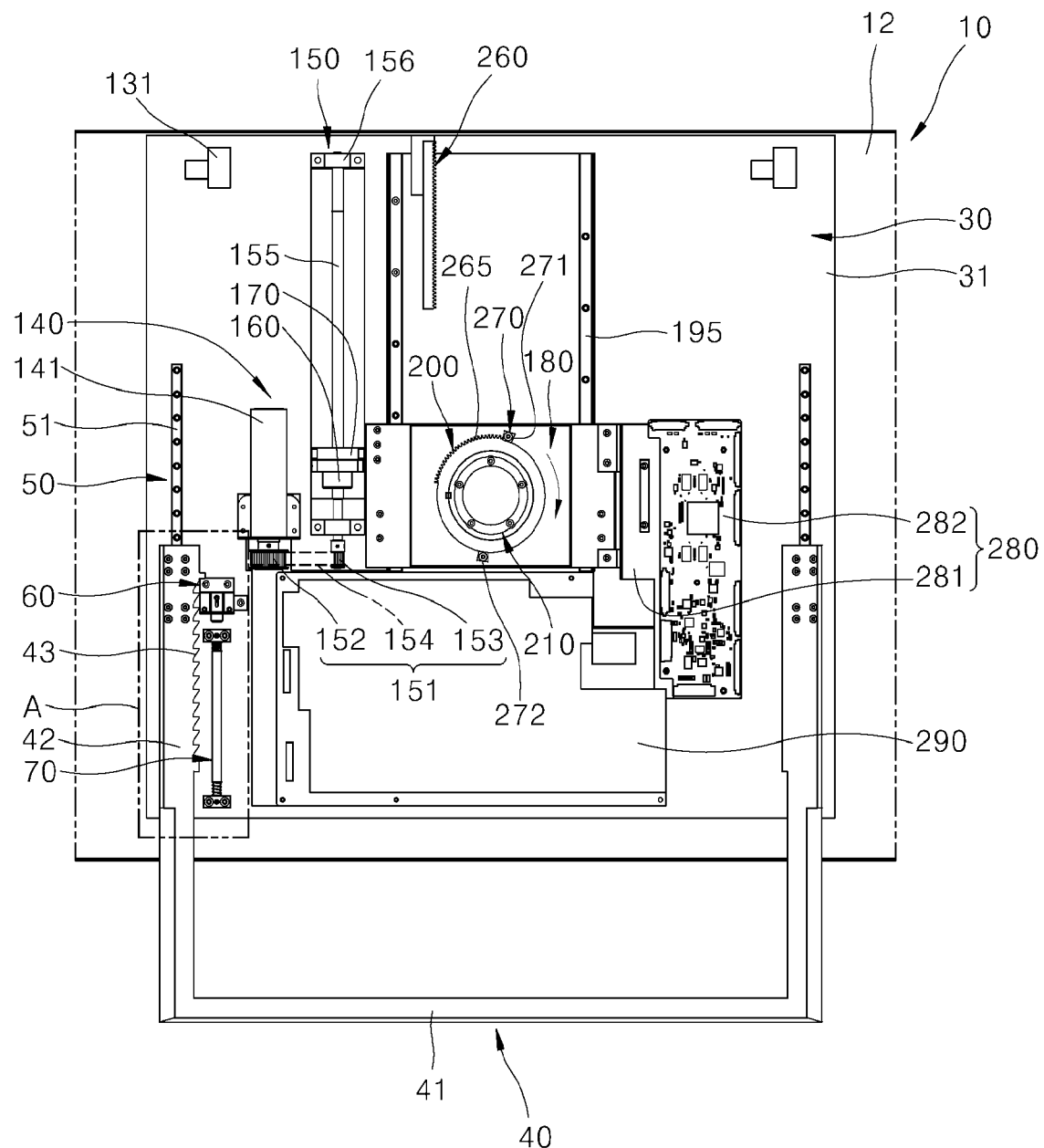
FIG. 19 is a front view showing a state in which a circular gear contacts a first stopper according to the first aspect of the present disclosure.

FIG. 19 is a front view showing a state in which the circular gear 265 is in contact with the first stopper 271 according to the first aspect of the present disclosure.

As shown in FIG. 19, while the circular gear 265 is in contact with the first stopper 271, additional rotation of the display module 10 is prevented. Thus, the display module 10 may be viewed in the first mode as the landscape viewing mode.

Further, when the circular gear 265 is separated from the linear gear 261, the display module 10 does not rotate. The user may adjust the vertical level of the display module 10 by adjusting the vertical level of the second movable body 180.

Moreover, when the user views the display module 10 in the landscape viewing mode as the first mode, and then changes the display module 10 to the portrait viewing mode as the second mode, the driver assembly 140 and the circular gear 265 operate in a reverse order to the above operation order, so that the display module 10 may be rotated.

In another example, when the use mode of the display apparatus 1 is intended to change from the standing mode to the wall mounted mode, as shown in FIG. 20, a bottom of the first movable bar 75 is pushed with the user's hand or pressurized with a separate tool to move the first movable bar 75 upwards. When the first movable bar 75 moves upward and thus the first actuating protrusion 63 moves upward, the protrusion connected to the first actuating protrusion 63 moves upward along and in the groove defined in the first switch protrusion 62. Therefore, the first switch protrusion 62 moves toward the inside of the first switch body 61, and the movement restriction of the first side gear 43 is disabled.

Figure 21:
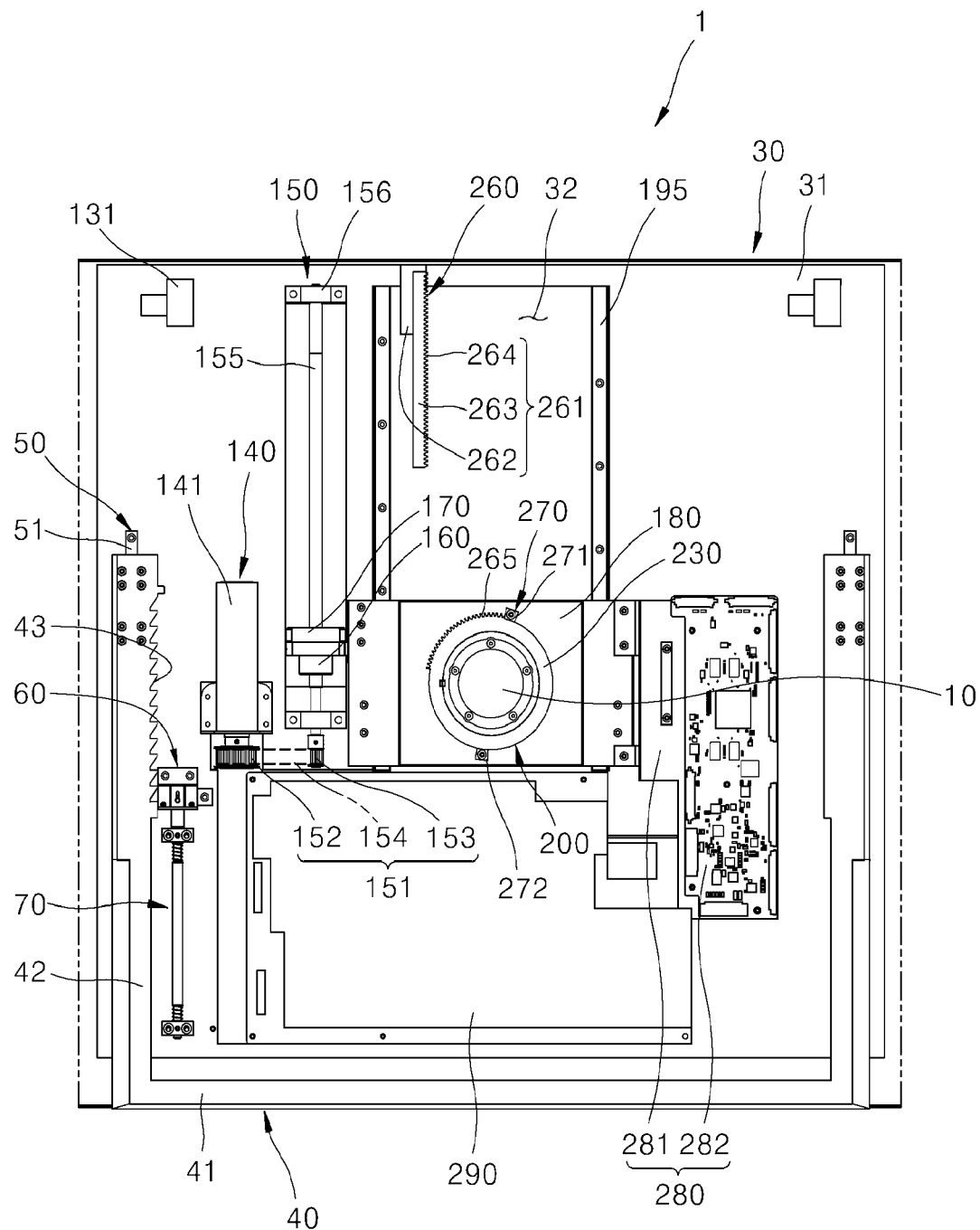
FIG. 21 is a front view showing a state in which a first bridge is moved into an inside of a first support body according to the first aspect of the present disclosure.

FIG. 21 is a front view showing a state in which the first bridge 40 moves inwardly of the first support body 31 according to the first aspect of the present disclosure.

As shown in FIG. 21, after the first bridge 40 moves upward, the pressure applied to the first movable bar 75 is removed. Thus, the first movement switch 60 is actuated and is engaged with the first side gear 43, thus restraining the vertical movement of the first bridge 40. In the same way, the second bridge 90 moves inwardly of the second support body 81.

Further, as shown in FIG. 3, the wall hanger 300 is inserted into the wall hanging groove defined in the rear side of the display apparatus 1. Thus, the display apparatus 1 may be fixed to the wall.

When the use mode of the display apparatus 1 is intended to change from the wall mounted mode to the standing mode, the first bridge 40 and the second bridge 90 are moved downward such that the display apparatus 1 may be used in a standing state as shown in FIGS. 1 and 2.

[Second Aspect]

Hereinafter, a guide mechanism 1260 according to a second aspect of the present disclosure will be described with reference to the drawings.

For the convenience of description, components having the same configuration and operation as those of the first aspect of the present disclosure are cited with the same reference numerals, and detailed descriptions thereof are omitted.

Figure 22:
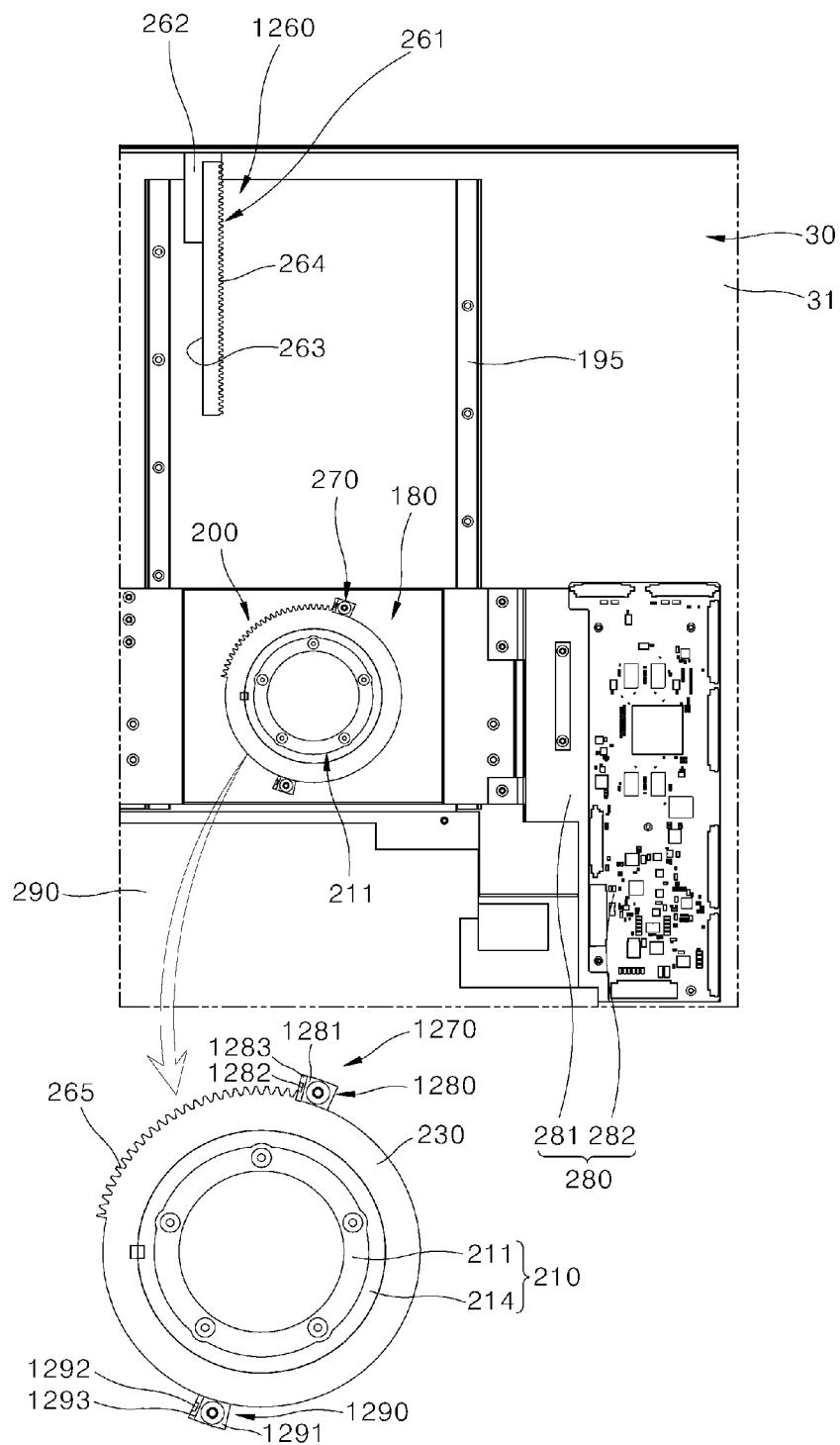
FIG. 22 is a front view showing a guide mechanism according to a second aspect of the present disclosure.
Figure 23:
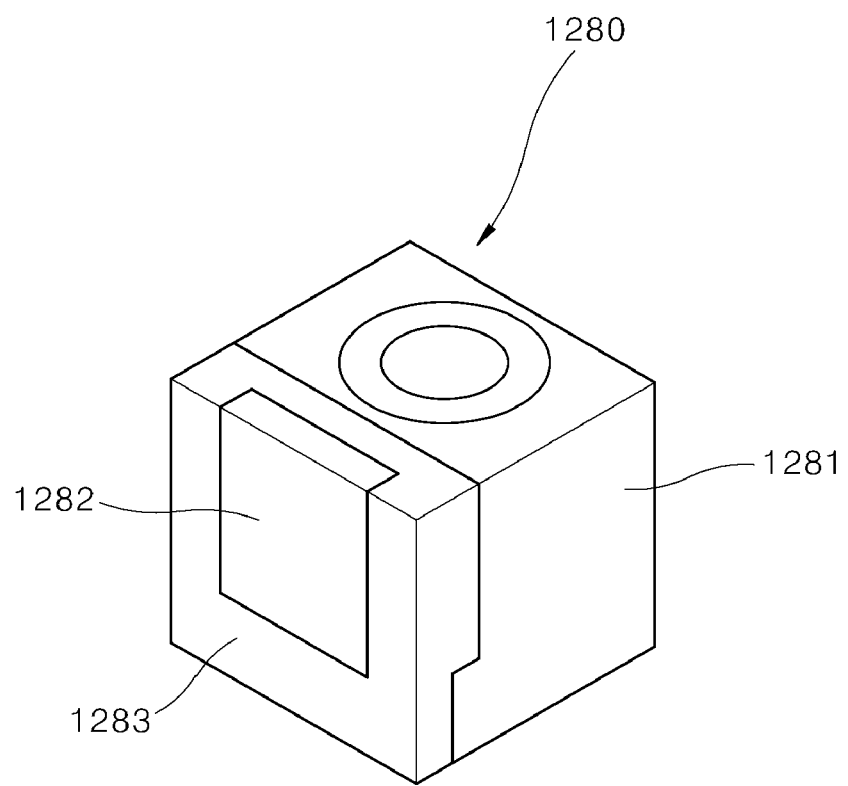
FIG. 23 is a perspective view showing a first stopper according to a second aspect of the present disclosure.

FIG. 22 is a front view showing the guide mechanism 1260 according to a second aspect of the present disclosure. FIG. 23 is a perspective view showing a first stopper 1271 according to a second aspect of the present disclosure. As shown in FIG. 22 and FIG. 23, the guide mechanism 1260 according to the second aspect of the present disclosure includes the linear gear 261, the circular gear 265 and a stopper 1270.

The linear gear 261 is fixed to the first support 30. Linearly arranged threads engaged with the circular gear 265 moving in a vertical direction is formed on a side face of the linear gear 261. The linear gear 261 includes the linear gear bracket 262, the linear gear body 263, and the linearly arranged threads 264. The linear gear 261 has the same configuration as that of the first aspect of the present disclosure, and thus detailed description thereof is omitted.

Further, the circular gear 265 is formed along and on an outer circumference of the rotatable connector 230, and rotates while meshing with the linear gear 261. The detailed description of the circular gear 265 is omitted because it has the same configuration as that of the first aspect of the present disclosure.

[Stopper]

The stopper 1270 is fixed to the swing bracket 210, and is located at the movement path of circular gear 265. Further, the stopper 1270 may have various modifications as long as the stopper 1270 guides the rotation of the circular gear 265 within a preset angle range. The stopper 1270 according to the second aspect of the present disclosure may include a first stopper 1280 and a second stopper 1290.

The first stopper 1280 protrudes outwardly of the swing bracket 210, and is engaged with one end of the circular gear 265 to restrain the rotation of the circular gear 265. The first stopper 1280 is embodied as a protrusion protruding outwardly of the swing bracket 210. Because the first stopper 1280 is engaged with one end of the circular gear 265 protruding outwardly of the circular gear 265, the stopper 1280 restricts the rotation of the circular gear 265 beyond the preset rotation angle range. The first stopper 1280 according to the second aspect of the present disclosure includes a first stopper body 1281, a first sensor 1282, and a first impact-absorbing member 1283.

The first stopper body 1281 is fixed to the second movable body 180. In order to constrain additional rotation of the circular gear 265 when the display module is in the first mode, that is, the landscape viewing mode, the first stopper body 1281 is installed to face one end of the circular gear 265.

The first impact-absorbing member 1283 is coupled to a side face of the first stopper body 1281 facing the circular gear 265. Since the first stopper body 1281 and the first impact-absorbing member 1283 face each other to form a step, a contact area between the first impact-absorbing member 1283 and the first stopper body 1281 increases. Therefore, a bonding force between the first impact-absorbing member 1283 and the first stopper body 1281 may be improved.

The first impact-absorbing member 1283 is made of an elastic material such as rubber or polyurethane. Thus, when the circular gear 265 contacts the first impact-absorbing member 1283, the first impact-absorbing member 1283 may reduce impact and noise. The first sensor 1282 is installed on a side face of the first impact-absorbing member 1283. Side faces of the first sensor 1282 and the first impact-absorbing member 1283 are flush with each other.

The first sensor 1282 measures a contact state between the circular gear 265 and the first stopper 1280, and delivers a measurement value to at least one of the fixed controller 290 or the movable controller 280.

The second stopper 1290 is spaced apart from the first stopper 1280, and protrudes outwardly of the swing bracket 210. The second stopper 1290 engages the other end of the circular gear 265 to restrain the rotation of the circular gear 265. The second stopper 1290 is embodied as a protrusion protruding outwardly of the swing bracket 210 like the first stopper 1280. Because the second stopper 1290 is engaged with the other end of the circular gear 265 protruding outwardly of the circular gear 265, the second stopper restricts rotation of the circular gear 265 beyond the preset rotation angle range. The second stopper 1290 according to a second aspect of the present disclosure includes a second stopper body 1291, a second sensor 1292, and a second impact-absorbing member 1293.

The second stopper body 1291 is fixed to the second movable body 180. In order to constrain additional rotation of the circular gear 265 when the display module is in the second mode, that is, the portrait viewing mode, the second stopper body 1291 is installed to face the other end of the circular gear 265.

The second impact-absorbing member 1293 is coupled to a side face of the second stopper body 1291 facing the circular gear 265. Since the second stopper body 1291 and the second impact-absorbing member 1293 face each other to form a step, a contact area between the second impact-absorbing member 1293 and the second stopper body 1291 increases. Therefore, a bonding force between the second impact-absorbing member 1293 and the second stopper body 1291 may be improved.

The second impact-absorbing member 1293 is made of an elastic material such as rubber or polyurethane. Thus, when the circular gear 265 contacts the second impact-absorbing member 1293, the second impact-absorbing member 1293 may reduce impact and noise. The second sensor 1292 is installed on a side face of the second impact-absorbing member 1293. Side faces of the second sensor 1292 and the second impact-absorbing member 1293 are flush with each other.

The second sensor 1292 measures a contact state between the circular gear 265 and the second stopper 1290, and delivers a measurement value to at least one of the fixed controller 290 or the movable controller 280.

In the display apparatus according to the present disclosure, the display module 10 is rotated under the operation of the driver assembly 140, and may switch between the landscape viewing mode and the portrait viewing mode to satisfy various consumer preferences.

Further, the display apparatus according to the present disclosure may satisfy various preferences of consumers because the vertical level of the display module 10 is automatically adjusted under the operation of the driver assembly 140.

Further, in the display apparatus according to the present disclosure, the connector assembly 200 which is moved in the vertical direction via the driver assembly 140 may be rotated via the guide mechanism 260. Thus, the rotation of the display module 10 that outputs the image is easily made, thus reducing the time and cost required for rotating the display module 10.

Further, in the display apparatus according to the present disclosure, the support assembly 20 supporting the display module 10 may switch between the standing mode and the wall mounted mode. Thus, an installation cost thereof may be reduced.

Further, in the display apparatus according to the present disclosure, the movable controller 280 that moves together with the display module 10 and the fixed controller 290 that is fixed to the support assembly 20 are separately installed from each other. Thus, the display module 10 may be light, and a simple maintenance structure thereof may be realized to reduce a maintenance cost thereof.

In addition to the effects as described above, specific effects in accordance with the present disclosure will be described together with the above detailed descriptions for carrying out the disclosure.

As described above, the present disclosure is described with reference to the drawings. However, the present disclosure is not limited to the aspects and drawings disclosed in the present specification. It will be apparent that various modifications may be made thereto by those skilled in the art within the scope of the present disclosure. Furthermore, although the effect resulting from the features of the present disclosure has not been explicitly described in the description of the aspects of the present disclosure, it is obvious that a predictable effect resulting from the features of the present disclosure should be recognized.

What is claimed is:

1. A display apparatus comprising:
   a display module displaying an image;
   a support assembly facing the display module;
   a driver assembly installed on the support assembly;
   a linearly-movable assembly linearly moving by using power from the driver assembly;
   a connector assembly having one end fixed to the display module and another end rotatably disposed on the linearly-movable assembly; and
   a guide mechanism connected to the support assembly,
   wherein the connector assembly rotates corresponding to a linear movement of the linearly-movable assembly, and
   wherein the guide mechanism allows the display module to rotate such that the display module switches between a first mode as a landscape viewing mode and a second mode as a portrait viewing mode, wherein the guide mechanism includes:

a circular gear formed along and on an outer circumference of the connector assembly; and a linear gear having one portion fixed to the support assembly and another portion extending in a longitudinal direction of the support assembly, wherein linearly arranged threads are formed on a side face of the linear gear and mesh with the circular gear, wherein the circular gear moves in a linear direction together with the connector assembly and meshes with the linear gear and then rotates to allow the display module to rotate to switch between the first mode and the second mode.

2. The display apparatus of claim 1, wherein the display module moves linearly to a predetermined vertical level and then rotates to switch to the second mode when the display module switches from the first mode to the second mode.

3. The display apparatus of claim 1, wherein, in the first mode, a horizontal length of the display module is larger than a vertical length of the display module, and wherein, in the second mode, a horizontal length of the display module is smaller than a vertical length of the display module.

4. The display apparatus of claim 1, wherein the circular gear is formed only on a predefined section of an outer circumference of the connector assembly, and wherein the predefined section corresponds to a rotation angle range of the display module in which the display module switches between the first mode and the second mode.

5. The display apparatus of claim 1, wherein the guide mechanism further includes a stopper fixed to the connector assembly, and wherein the stopper is located at a movement path of the circular gear and allows the circular gear to rotate within a predefined rotation angle range.

6. The display apparatus of claim 5, wherein the stopper includes:

a first stopper protruding outwardly from the connector assembly and engaging with one end of the circular gear to restrain rotation of the circular gear; and a second stopper spaced apart from the first stopper, protruding outwardly from the connector assembly, and engaging with another end of the circular gear to restrain the rotation of the circular gear.

7. A display apparatus comprising:

a display module displaying an image;

a support assembly facing the display module;

a driver assembly installed on the support assembly;

a linearly-movable assembly linearly moving by using power from the driver assembly;

a connector assembly having one end fixed to the display module and another end rotatably disposed on the linearly-movable assembly; and a guide mechanism connected to the support assembly, wherein the connector assembly rotates corresponding to a linear movement of the linearly-movable assembly, and wherein the guide mechanism allows the display module to rotate such that the display module switches between a first mode as a landscape viewing mode and a second mode as a portrait viewing mode, wherein the connector assembly includes:

a swing bracket fixed to the display module facing the support assembly, and rotatably connected to the linearly-movable assembly; and a rotatable connector fixed to the swing bracket protruding outwardly from the linearly-movable assembly, and rotating together with the display module such that the display module switches between the first mode and the second mode.

8. The display apparatus of claim 7, wherein the connector assembly further includes an annular bearing installed on an outer face of the swing bracket, and located between the swing bracket and the linearly-movable assembly to reduce a frictional force generated when the swing bracket rotates.

9. A display apparatus comprising:

a display module displaying an image;

a support assembly facing the display module;

a driver assembly installed on the support assembly;

a linearly-movable assembly linearly moving by using power from the driver assembly;

a connector assembly having one end fixed to the display module and another end rotatably disposed on the linearly-movable assembly; and a guide mechanism connected to the support assembly, wherein the connector assembly rotates corresponding to a linear movement of the linearly-movable assembly, and wherein the guide mechanism allows the display module to rotate such that the display module switches between a first mode as a landscape viewing mode and a second mode as a portrait viewing mode, further comprising a movable controller moving in a linear manner together with the connector assembly, and connected to the display module to control vertical movement and rotation of the display module.

10. The display apparatus of claim 9, further comprising a fixed controller fixed to the support assembly, and connected to at least one of the display module or the movable controller to control an operation of the display module.

11. A display apparatus comprising:

a display module including a display panel that displays images, and a support panel located on a rear side of the display panel to support the display panel;

a support assembly facing the display module;

a driver assembly installed on the support assembly to supply power to rotate the display module;

a linearly-movable assembly connected to the driver assembly to receive power therefrom and moving in a linear manner in a first direction along the support assembly;

a connector assembly having one end fixed to the display module and another end rotatably disposed on the linearly-movable assembly; and a guide mechanism connected to the support assembly, wherein the connector assembly rotates corresponding to a linear movement of the linearly-movable assembly, and wherein the display module moves in a linear manner corresponding to a linear movement of the linearly-movable assembly, and rotates with guidance by the guide mechanism inducing rotation from the linear movement via engagement between gears, wherein the guide mechanism includes:

a circular gear formed along and on an outer circumference of the connector assembly; and a linear gear having one portion fixed to the support assembly and another portion extending in a longitudinal direction of the support assembly, and having linearly arranged threads formed on a side face of the linear gear that meshes with the circular gear.

12. The display apparatus of claim 11, wherein the guide mechanism allows the display module to rotate such that the display module switches between a first mode as a landscape viewing mode and a second mode as a portrait viewing mode, and wherein the display module moves linearly to a predetermined vertical level and then rotates to switch to the second mode when the display module switches from the first mode to the second mode.

13. A display apparatus comprising:
a display module including a display panel that displays images, and a support panel located on a rear side of the display panel to support the display panel;
a support assembly facing the display module;
a driver assembly installed on the support assembly to supply power to rotate the display module;
a linearly-movable assembly connected to the driver assembly to receive power therefrom and moving in a linear manner in a first direction along the support assembly;
a connector assembly having one end fixed to the display module and another end rotatably disposed on the linearly-movable assembly; and
a guide mechanism connected to the support assembly,
wherein the connector assembly rotates corresponding to a linear movement of the linearly-movable assembly, and
wherein the display module moves in a linear manner corresponding to a linear movement of the linearly-movable assembly, and rotates with guidance by the guide mechanism inducing rotation from the linear movement via engagement between gears,
wherein the connector assembly includes:
a swing bracket fixed to the display module facing the support assembly, and rotatably connected to the linearly-movable assembly; and
a rotatable connector fixed to the swing bracket protruding outwardly from the linearly-movable assembly.

14. A display apparatus comprising:
a display module including a display panel that displays images, and a support panel located on a rear side of the display panel to support the display panel;
a support assembly facing the display module;
a driver assembly installed on the support assembly to supply power to rotate the display module;
a linearly-movable assembly connected to the driver assembly to receive power therefrom and moving in a linear manner in a first direction along the support assembly;
a connector assembly having one end fixed to the display module and another end rotatably disposed on the linearly-movable assembly; and
a guide mechanism connected to the support assembly,
wherein the connector assembly rotates corresponding to a linear movement of the linearly-movable assembly, and
wherein the display module moves in a linear manner corresponding to a linear movement of the linearly-movable assembly, and rotates with guidance by the guide mechanism inducing rotation from the linear movement via engagement between gears,
wherein the linearly-movable assembly includes:
a screw bar rotating upon receiving the power from the driver assembly, and having threads on an outer face of the screw bar;
a ball nut engaging with the threads and installed on an outer face of the screw bar, wherein the ball nut moves in a linear manner under the rotation of the screw bar;
a first movable body coupled to the ball nut and moving in a linear manner together with the ball nut; and
a second movable body coupled to the first movable body and moving in a linear manner together with the first movable body.

15. The display apparatus of claim 14, wherein the linearly-movable assembly further includes:
a linear rail fixed to the support assembly and extending in a linear manner along a movement path of the second movable body; and
a movable block supported on an outer face of the linear rail, and fixed to the second movable body and moving together with the second movable body.

16. The display apparatus of claim 14, wherein the linearly-movable assembly further includes a power transmitter to transmit the power from the driver assembly to the screw bar.

17. The display apparatus of claim 16, wherein the power transmitter includes:
a driving gear connected to a driving shaft of the driver assembly;
a driven gear connected to the screw bar; and
a belt connecting the driving gear and the driven gear to each other to transmit a power between the driving gear and the driven gear.

18. A display apparatus comprising:
a display module including a display panel that displays images, and a support panel located on a rear side of the display panel to support the display panel;
a support assembly facing the display module;
a driver assembly installed on the support assembly to supply power to rotate the display module;
a linearly-movable assembly connected to the driver assembly to receive power therefrom and moving in a linear manner in a first direction along the support assembly;
a connector assembly having one end fixed to the display module and another end rotatably disposed on the linearly-movable assembly; and
a guide mechanism connected to the support assembly,
wherein the connector assembly rotates corresponding to a linear movement of the linearly-movable assembly, and
wherein the display module moves in a linear manner corresponding to a linear movement of the linearly-movable assembly, and rotates with guidance by the guide mechanism inducing rotation from the linear movement via engagement between gears,
wherein the support assembly includes:
a first support located on a rear side of the display module;
a second support facing the first support; and
a hinge-type connector to pivotally connect the first support and the second support to each other.

19. The display apparatus of claim 18, wherein the first support includes:
a first support body facing the display module;
a first bridge extending from or retracting toward the first support body; and
a first bridge guide connected to the first support body and the first bridge, and guiding a linear movement of the first bridge.

20. The display apparatus of claim 18, wherein the second support includes:
a second support body facing the first support;

a second bridge extending from or retracting toward the second support body; and a second bridge guide connected to the second support body and the second bridge, wherein the second bridge guide guides a linear movement of the second bridge.

* * * * *